(12) United States Patent
Yang

(10) Patent No.: US 12,124,525 B2
(45) Date of Patent: Oct. 22, 2024

(54) PAGE PROCESSING METHOD AND APPARATUS, STORAGE MEDIUM, AND TERMINAL DEVICE

(71) Applicant: HUAWEI TECHNOLOGIES CO., LTD., Shenzhen (CN)

(72) Inventor: Jianye Yang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/854,509

(22) Filed: Jun. 30, 2022

(65) Prior Publication Data

US 2022/0335094 A1 Oct. 20, 2022

Related U.S. Application Data

(63) Continuation of application No. PCT/CN2020/124154, filed on Oct. 27, 2020.

(30) Foreign Application Priority Data

Dec. 30, 2019 (CN) .......................... 201911391187.1

(51) Int. Cl.
*G06F 16/9538* (2019.01)
*G06F 16/904* (2019.01)
(Continued)

(52) U.S. Cl.
CPC .......... *G06F 16/954* (2019.01); *G06F 16/904* (2019.01); *G06F 16/9535* (2019.01); *G06F 16/9538* (2019.01)

(58) Field of Classification Search
CPC .. G06F 16/954; G06F 16/904; G06F 16/9535; G06F 16/9538; G06F 16/955; G06F 16/9574
See application file for complete search history.

(56) References Cited

U.S. PATENT DOCUMENTS 6,460,060 B1 10/2002 Maddalozzo, Jr. et al.
2006/0224997 A1* 10/2006 Wong .................. G06F 16/9562
715/838

(Continued)

FOREIGN PATENT DOCUMENTS

| CN | 103412923 A | 11/2013 |
|----|-------------|---------|
| CN | 103577490 A | 2/2014 |
| CN | 104216967 A | 12/2014 |

OTHER PUBLICATIONS

International Search Report issued in corresponding International Application No. PCT/CN2020/124154, dated Jan. 20, 2021, pp. 1-8.

(Continued)

*Primary Examiner* — Sanchita Roy
(74) *Attorney, Agent, or Firm* — HAUPTMAN HAM, LLP

(57) ABSTRACT

A page processing method is provided. The page processing method includes: when a preset trigger instruction for a currently running application is detected, displaying a historical browsing view of the application, where the historical browsing view is established based on page browsing information, and the page browsing information includes one or more browsing pages browsed by a user; and returning, in response to a selection operation performed by the user in the historical browsing view, to a target browsing page corresponding to the selection operation, where the target browsing page is any of the browsing pages. In this way, a page returning operation is simplified, and the user can easily and quickly return to the browsing page specified by the user, which improves user experience.

19 Claims, 12 Drawing Sheets

(51) Int. Cl.
*G06F 16/9535* (2019.01)
*G06F 16/954* (2019.01)

(56) References Cited

U.S. PATENT DOCUMENTS

| | | | |
|---|---|---|---|
| 2011/0191344 A1* | 8/2011 | Jin | G06F 16/00 |
| | | | 707/769 |
| 2013/0080420 A1 | 3/2013 | Taylor et al. | |
| 2014/0359489 A1 | 12/2014 | Zhao et al. | |
| 2015/0019577 A1 | 1/2015 | Bouvigne et al. | |
| 2016/0217292 A1* | 7/2016 | Faaborg | H04L 63/105 |
| 2017/0351387 A1* | 12/2017 | Li | G06F 16/9574 |
| 2018/0232534 A1* | 8/2018 | Dotan-Cohen | H04W 12/033 |
| 2020/0192951 A1* | 6/2020 | Singhal | G06F 16/908 |
| 2021/0194889 A1* | 6/2021 | Rhee | H04W 4/02 |

OTHER PUBLICATIONS

Extended European Search Report issued in corresponding European Application No. 20909393.9, dated Dec. 14, 2022, pp. 1-9.

\* cited by examiner

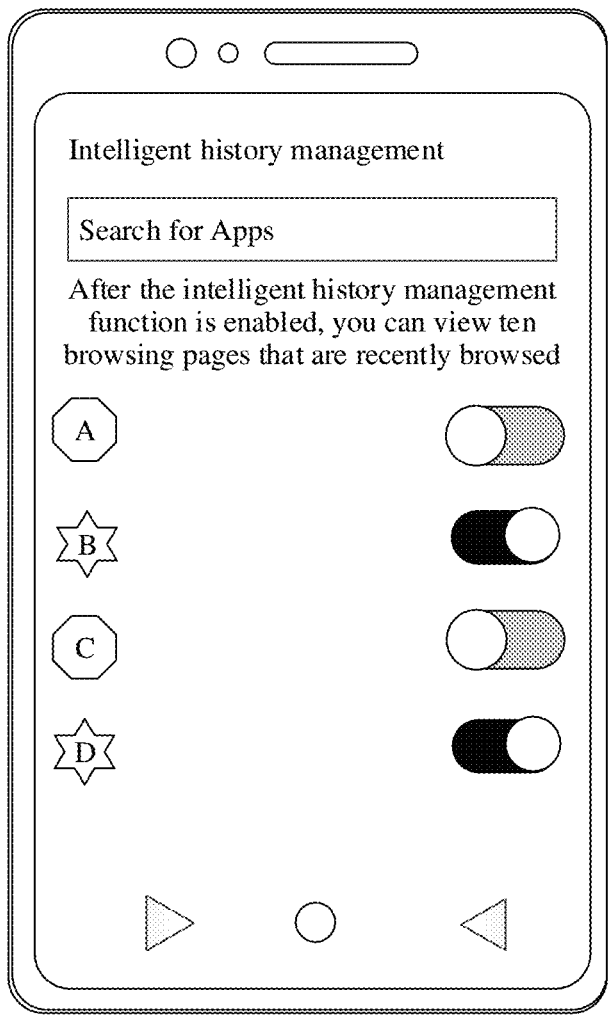

FIG. 3

When a preset trigger instruction for a currently running application is detected, display a historical browsing view of the application, where the historical browsing view is established based on page browsing information, and the page browsing information includes one or more browsing pages browsed by a user ⟶ S401

Return, in response to a selection operation performed by the user in the historical browsing view, to a target browsing page corresponding to the selection operation, where the target browsing page is any of the browsing pages ⟶ S402

FIG. 4

PAGE PROCESSING METHOD AND APPARATUS, STORAGE MEDIUM, AND TERMINAL DEVICE

CROSS-REFERENCE TO RELATED APPLICATIONS

This application is a continuation of International Application No. PCT/CN2020/124154, filed on Oct. 27, 2020, which claims priority to Chinese Patent Application No. 201911391187.1, filed on Dec. 30, 2019. The disclosures of the aforementioned applications are hereby incorporated by reference in their entireties.

TECHNICAL FIELD

This application pertains to the field of terminal technologies, and in particular, relates to a page processing method and apparatus, a computer-readable storage medium, and a terminal device.

BACKGROUND

With development of terminal technologies, a user may install various applications in a terminal device, and may obtain content that interests the user by browsing pages in the applications. Currently, after the user browses a plurality of pages in an application, if the user wants to return to a historical browsing page, the user needs to first return to a home page of the application, and tap "Me" and "My footprint" and the like on the home page to return to the historical browsing page. An operation process is cumbersome, and efficiency is low.

SUMMARY

Embodiments of this application provide a page processing method and apparatus, a computer-readable storage medium, and a terminal device, to help a user easily and quickly return to a browsing page specified by the user.

According to a first aspect, an embodiment of this application provides a page processing method that may include:

when a preset trigger instruction for a currently running application is detected, displaying a historical browsing view of the application, where the historical browsing view is established based on page browsing information, and the page browsing information includes one or more browsing pages browsed by a user; and returning, in response to a selection operation performed by the user in the historical browsing view, to a target browsing page corresponding to the selection operation, where the target browsing page is any of the browsing pages.

It should be understood that the page browsing information may include one or more browsing pages browsed by the user, and the historical browsing view may be a view formed by arranging the one or more browsing pages. In addition, the constructed historical browsing view may be stored in a local database and a database file corresponding to the application.

Herein, the preset trigger instruction may be an instruction generated by triggering a preset button, or may be an instruction generated by triggering a preset gesture, or may be an instruction generated by triggering a preset gesture by using a specific part (for example, may be a trigger instruction generated by making an "M" gesture with a knuckle), or may be an instruction generated by triggering a preset voice keyword. This is not limited in embodiments of this application.

In this embodiment of this application, when the user browses a page in the application, page browsing information may be obtained in real time, and the historical browsing view of the application may be established based on the obtained page browsing information. When the preset trigger instruction for the application is detected, the historical browsing view may be directly displayed, and the target browsing page is returned to based on the selection operation performed by the user in the historical browsing view. In this way, a page returning operation is simplified, and the user can easily and quickly return to the browsing page specified by the user, which improves user experience.

Optionally, before the displaying a historical browsing view of the application, the method may include:

obtaining a current application state of the application; and when the current application state is a preset application state, obtaining the page browsing information in the application, and establishing the historical browsing view of the application based on the page browsing information.

Herein, a function switch for the application may be set, and the function switch may enable or disable a history management function of the application. Therefore, when the application is started, whether the function switch of the application is on may be determined by obtaining the current application state of the application and determining whether the current application state of the application is the preset application state, so that whether the history management function of the application is enabled can be determined, and then whether to establish the historical browsing view of the application can be determined. The preset application state is an application state corresponding to the application when the function switch is on.

Optionally, when the page browsing information includes a plurality of browsing pages browsed by the user, the establishing the historical browsing view of the application based on the page browsing information may include:

obtaining page thumbnails corresponding to the browsing pages and browsing times corresponding to the browsing pages in the page browsing information, and establishing the historical browsing view of the application based on the page thumbnails and the browsing times, where the page thumbnails in the historical browsing view are arranged based on the browsing times.

Herein, the page thumbnails in the historical browsing view may be arranged based on browsing times corresponding to the browsing pages. For example, the page thumbnails may be arranged in the historical browsing view in a reverse chronological order based on the browsing times.

For example, the historical browsing view may include one or more view pages. Each view page may include one or more page thumbnails arranged in a form of cards. The page thumbnail in each view page may be arranged based on the browsing time. For example, for a browsing page with a later browsing time, a page thumbnail corresponding to the browsing page is arranged in the front of the view page, and for a browsing page with an earlier browsing time, a page thumbnail corresponding to the browsing page is arranged at the rear of the view page.

It should be noted that, when the historical browsing view includes a plurality of view pages, the user may switch between the view pages based on a specific situation.

For example, the user may switch between the view pages by tapping a virtual button on the view page, to switch to a next view page or return to a previous view page. For example, the user may alternatively switch between the view pages by tapping a touch control button on a terminal device, for example, by tapping a touch control button on a side of the terminal device.

Herein, a quantity of page thumbnails corresponding to the view page may be determined based on a user setting, or may be determined based on a default setting of the terminal device.

For example, image sizes of the page thumbnails corresponding to the browsing pages may be the same. Specifically, an image size of a page thumbnail based on a size of a screen of the terminal device and the quantity of page thumbnails corresponding to the view page in the historical browsing view may be determined.

For example, the image sizes of the page thumbnails corresponding to the browsing pages may alternatively be different, so that the browsing pages are displayed differentially, which helps the user to quickly locate the target browsing page that the user eventually wants to return to.

In a possible implementation, the obtaining page thumbnails corresponding to the browsing pages and browsing times corresponding to the browsing pages in the page browsing information, and establishing the historical browsing view of the application based on the page thumbnails and the browsing times may include:

obtaining a page identifier corresponding to each browsing page in the page browsing information;

determining a first target browsing page based on the page identifier and a preset page identifier in the application, and obtaining a first page thumbnail corresponding to the first target browsing page and a first browsing time corresponding to the first target browsing page; and establishing the historical browsing view of the application based on the first page thumbnail and the first browsing time.

Specifically, the preset page identifier corresponding to the target browsing page may be configured in advance based on a configuration file of the application, where the preset page identifier may include one or more preset page identifiers. In this case, when the user browses a page in the application, a page identifier of the page browsed by the user may be obtained in real time, and whether the page identifier of the browsing page is the preset page identifier may be determined. When the page identifier of the browsing page is the preset page identifier, the browsing page may be determined as a first target browsing page, and the historical browsing view of the application may be established based on a first page thumbnail and a first browsing time corresponding to the first target browsing page, to avoid that the established historical browsing view includes all browsing pages browsed by the user, and effectively reduce the quantity of page thumbnails in the historical browsing view, which helps the user conveniently and quickly return to a browsing page specified by the user. In this way, user experience is improved.

In another possible implementation, the obtaining page thumbnails corresponding to the browsing pages and browsing times corresponding to the browsing pages in the page browsing information, and establishing the historical browsing view of the application based on the page thumbnails and the browsing times may include:

obtaining page content corresponding to each browsing page in the page browsing information;

determining a second target browsing page based on the page content, and obtaining a second page thumbnail corresponding to the second target browsing page and a second browsing time corresponding to the second target browsing page; and establishing the historical browsing view of the application based on the second page thumbnail and the second browsing time.

Herein, when the user browses a page in the application, page content of the browsing page can be obtained in real time, and content analysis may be performed automatically on the page content to obtain a second target browsing page, so that the historical browsing view of the application may be established based on a second page thumbnail and a second browsing time corresponding to the second target browsing page. In this way, the quantity of page thumbnails in the historical browsing view can be effectively reduced, which helps the user conveniently and quickly return to a browsing page specified by the user. Therefore, user experience is improved.

For example, after the establishing the historical browsing view of the application based on the page browsing information, the method may include:

obtaining page content corresponding to each browsing page in the page browsing information, and determining a page keyword corresponding to each page thumbnail based on each piece of page content; and when a search keyword entered by the user is received, obtaining and displaying a third page thumbnail based on the search keyword and the page keyword, where the third page thumbnail is any of the page thumbnails.

It should be understood that to improve a page returning efficiency and user experience, after the historical browsing view of the application is established based on the page browsing information, the page content corresponding to each browsing page in the page browsing information may be obtained first, the page keyword corresponding to each browsing page may be determined based on the page content, and each determined page keyword is associated with the page thumbnail corresponding to each browsing page, so that the page keyword serves as an index of each page thumbnail.

In this case, when the historical browsing view is displayed, a search box may be further provided in a display interface for displaying the historical browsing view. The user may enter a search keyword in the search box, to quickly obtain and display a corresponding third page thumbnail based on the search keyword and the page keyword. The user can quickly return to a corresponding target browsing page by tapping the third page thumbnail. In other words, a search function can help the user conveniently and quickly locate the target browsing page that the user wants to return to, which improves user experience.

In a possible implementation, the obtaining the page browsing information in the application, and establishing the historical browsing view of the application based on the page browsing information may include:

obtaining first page browsing information in a first application and second page browsing information in a second application; and establishing a first historical browsing view of the first application based on the first page browsing information, and establishing a second historical browsing view of the second application based on the second page browsing information; and the displaying a historical browsing view of the application may include:

displaying the first historical browsing view of the first application and the second historical browsing view of the second application.

Optionally, after the displaying the first historical browsing view of the first application and the second historical browsing view of the second application, the method further includes:

dragging a fourth page thumbnail to a fifth page thumbnail based on a dragging operation performed by the user between the first historical browsing view and the second historical browsing view, where the fourth page thumbnail is any page thumbnail in the first historical browsing view, and the fifth page thumbnail is any page thumbnail in the second historical browsing view; and the returning, in response to a selection operation performed by the user in the historical browsing view, to a target browsing page corresponding to the selection operation may include:

returning, in response to a selection operation performed by the user on the fifth page thumbnail, to a fifth target browsing page that includes the fourth page thumbnail, where the fifth target browsing page is a browsing page corresponding to the fifth page thumbnail.

It should be understood that, to implement data sharing between applications and strengthen an association between the applications, the first historical browsing view of the first application and the second historical browsing view of the second application may be established simultaneously. When a trigger instruction entered by the user is detected, the first historical browsing view and the second historical browsing view may be displayed simultaneously, and the page thumbnail may be moved based on the dragging operation performed by the user between the first historical browsing view and the second historical browsing view. In this way, a data sharing requirement of the user can be met, and user experience can be improved.

According to a second aspect, an embodiment of this application provides a page processing apparatus that may include:

a browsing view display module, configured to: when a preset trigger instruction for a currently running application is detected, display a historical browsing view of the application, where the historical browsing view is established based on page browsing information, and the page browsing information includes one or more browsing pages browsed by a user; and a browsing page returning module, configured to: in response to a selection operation performed by the user in the historical browsing view, return to a target browsing page corresponding to the selection operation, where the target browsing page is any of the browsing pages.

Optionally, the page processing apparatus may further include:

an application state obtaining module, configured to obtain a current application state of the application; and a browsing view establishment module, configured to: when the current application state is a preset application state, obtain the page browsing information in the application, and establish the historical browsing view of the application based on the page browsing information.

For example, when the page browsing information includes a plurality of browsing pages browsed by the user, the browsing view establishment module may include:

a first browsing view establishment unit, configured to: obtain page thumbnails corresponding to the browsing pages and browsing times corresponding to the browsing pages in the page browsing information, and establish the historical browsing view of the application based on the page thumbnails and the browsing times, where the page thumbnails in the historical browsing view are arranged based on the browsing times.

In a possible implementation, the first browsing view establishment unit may include:

a page identifier obtaining subunit, configured to obtain a page identifier corresponding to each browsing page in the page browsing information;

a first target page determining subunit, configured to determine a first target browsing page based on the page identifier and a preset page identifier in the application, and obtain a first page thumbnail corresponding to the first target browsing page and a first browsing time corresponding to the first target browsing page; and a first browsing view establishment subunit, configured to establish the historical browsing view of the application based on the first page thumbnail and the first browsing time.

In another possible implementation, the first browsing view establishment unit may further include:

a page content obtaining subunit, configured to obtain page content corresponding to each browsing page in the page browsing information;

a second target page determining subunit, configured to determine a second target browsing page based on the page content, and obtain a second page thumbnail corresponding to the second target browsing page and a second browsing time corresponding to the second target browsing page; and a second browsing view establishment subunit, configured to establish the historical browsing view of the application based on the second page thumbnail and the second browsing time.

Optionally, the page processing apparatus may further include:

a page keyword determining module, configured to obtain page content corresponding to each browsing page in the page browsing information, and determine a page keyword corresponding to each page thumbnail based on each piece of page content; and a page searching module, configured to: when a search keyword entered by the user is received, obtain and display a third page thumbnail based on the search keyword and the page keyword, where the third page thumbnail is any of the page thumbnails.

For example, the browsing view establishment module may include:

a browsing information obtaining unit, configured to obtain first page browsing information in a first application and second page browsing information in a second application; and a second browsing view establishment unit, configured to establish a first historical browsing view of the first application based on the first page browsing information, and establish a second historical browsing view of the second application based on the second page browsing information; and the browsing view display module is further configured to display the first historical browsing view of the first application and the second historical browsing view of the second application.

In a possible implementation, the page processing apparatus may further include:

a dragging module, configured to drag a fourth page thumbnail to a fifth page thumbnail based on a dragging operation performed by the user between the first historical browsing view and the second historical browsing view, where the fourth page thumbnail is any page thumbnail in the first historical browsing view, and the fifth page thumbnail is any page thumbnail in the second historical browsing view; and the browsing page returning module is further configured to return, in response to a selection operation performed by the user on the fifth page thumbnail, to a fifth target browsing page that includes the fourth page thumbnail, where the fifth target browsing page is a browsing page corresponding to the fifth page thumbnail.

According to a third aspect, an embodiment of this application provides a terminal device, including a memory, a processor, and a computer program that is stored in the memory and that can be run on the processor. When executing the computer program, the processor implements the page processing method according to any one of the first aspect and the implementations of the first aspect.

According to a fourth aspect, an embodiment of this application provides a computer-readable storage medium. The computer-readable storage medium stores a computer program, and when the computer program is executed by a processor, the page processing method according to any one of the first aspect and the implementations of the first aspect is implemented.

According to a fifth aspect, an embodiment of this application provides a computer program product. When the computer program product is run on a terminal device, the terminal device is enabled to perform the page processing method according to any one of the first aspect and the implementations of the first aspect.

It may be understood that, for beneficial effects of the second aspect to the fifth aspect, refer to the related descriptions in the first aspect. Details are not described herein again.

Compared with the conventional technology, embodiments of this application have the following beneficial effects.

In this embodiment of this application, when a user browses a page in an application, page browsing information may be obtained, and a historical browsing view of the application may be established based on the obtained page browsing information. When a preset trigger instruction for the application is detected, the historical browsing view may be directly displayed, and a target browsing page is returned to based on a selection operation performed by the user in the historical browsing view. In this way, a page returning operation is simplified, and the user can easily and quickly return to a browsing page specified by the user, which improves user experience.

BRIEF DESCRIPTION OF DRAWINGS

FIG. 3 is a schematic diagram of enabling a history management function of an application according to an embodiment of this application;

FIG. 4 is a schematic flowchart of a page processing method according to an embodiment of this application;

DESCRIPTION OF EMBODIMENTS

Figure 1:
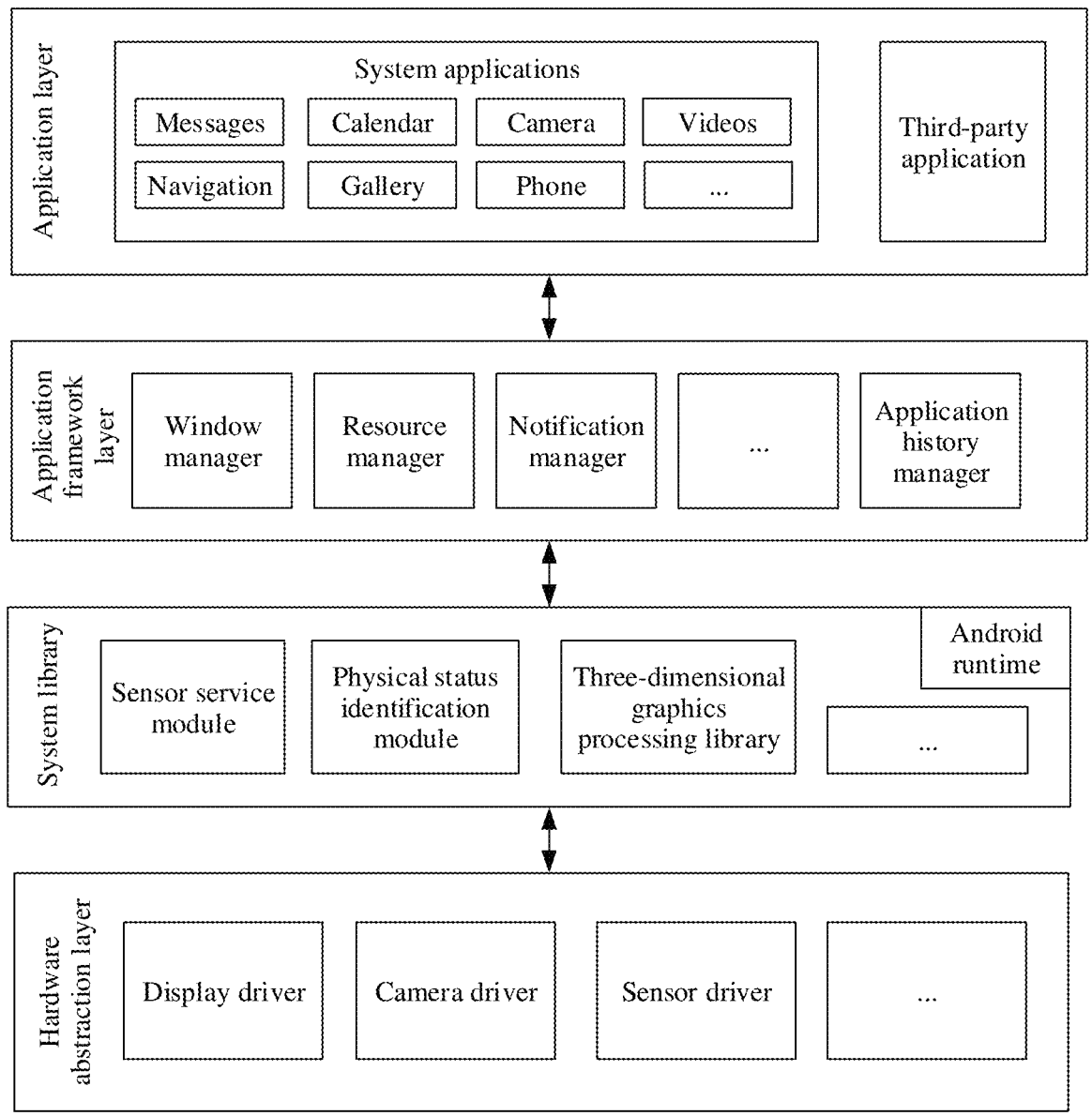
FIG. 1 is a block diagram of a software architecture of a terminal device to which a page processing method is applicable according to an embodiment of this application.

In the following descriptions, to illustrate rather than limit, specific details such as a particular system structure and a technology are provided to make a thorough understanding of embodiments of this application. However, a person skilled in the art should know that this application may also be implemented in other embodiments without these specific details. In other cases, detailed descriptions of well-known systems, apparatuses, circuits, and methods are omitted, so that this application is described without being obscured by unnecessary details.

It should be understood that, when used in the specification and claims of this application, the term "include" indicates presence of described features, entireties, steps, operations, elements, and/or components, but does not exclude presence or addition of one or more other features, entireties, steps, operations, elements, components, and/or collections thereof.

It should be further understood that the term "and/or" used in the specification and claims of this application indicates any combination and all possible combinations of one or more items listed in association, and includes the combinations.

As used in the specification and the claims of this application, the term "if" may be interpreted as "when", "once", "in response to determining", or "in response to detecting" depending on the context. Similarly, the phrase "if it is determined" or "if the [described condition or event] is detected" may be interpreted as "once determined" or "in response to determining" or "once the [described condition or event] is detected" or "in response to detecting the [described condition or event]" depending on the context.

In addition, in the descriptions of the specification and claims of this application, the terms "first", "second", "third", and the like are merely used for differentiation and description, but shall not be understood as an indication or an implication of relative importance.

Referring to "an embodiment" or "some embodiments" or the like in the specification of this application means that one or more embodiments of this application include a specific feature, structure, or characteristic described with reference to the embodiment. Therefore, statements such as "in an embodiment", "in some embodiments", "in some other embodiments", and "in other embodiments" that appear at different places in this specification do not necessarily mean referring to a same embodiment, instead, they mean "one or more but not all of the embodiments", unless otherwise specifically emphasized. The terms "include", "contain", "have", and their variants all mean "include but are not limited to", unless otherwise specifically emphasized.

A page processing method provided in embodiments of this application may be applied to a terminal device such as a mobile phone, a tablet computer, a wearable device, a vehicle-mounted device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). A specific type of the terminal device is not limited in embodiments of this application.

With development of terminal technologies, a user may install various applications in a terminal device, and may obtain content that interests the user by browsing pages in the applications. Currently, after the user browses a plurality of pages in an application, if the user wants to return to a historical browsing page, the user needs to first return to a home page of the application, and tap "Me" and "My footprint" and the like on the home page to return to the historical browsing page. In other words, in the existing applications, the user needs to use a history record function hidden in the application to return to a specific historical browsing page. This returning manner has a cumbersome operation process, and efficiency is low. In addition, for an application that does not have a history record function, when the user refreshes a home page of the application, the user cannot return to a specific historical browsing page, which greatly affects user experience.

To resolve the foregoing problems, embodiments of this application provide a page processing method and apparatus, a computer-readable storage medium, and a terminal device. When a user browses a page in an application, the terminal device may obtain page browsing information, and establish a historical browsing view of the application based on the obtained page browsing information. When a preset trigger instruction for the application is detected, the historical browsing view may be directly displayed, and a target browsing page is returned to based on a selection operation performed by the user in the historical browsing view. In this way, a page returning operation is simplified, and the user can easily and quickly return to a browsing page specified by the user, which improves user experience.

FIG. 1 is a block diagram of a software structure of a terminal device according to an embodiment of this application. For example, an operating system of the terminal device is an Android system. In some embodiments, the Android system is classified into four layers: an application layer, an application framework (framework, FWK) layer, an Android runtime (Android Runtime) and system library, and a hardware abstraction layer. The layers communicate with each other through a software interface.

As shown in FIG. 1, the application layer may include a series of application packages. The application packages may be application packages provided by the system, or may be application packages obtained from a third party. The application packages may include applications such as Messages, Calendar, Camera, Videos, Music, Navigation, Gallery, Phone, News, and Instant messaging.

The application framework layer provides an application programming interface (application programming interface, API) and a programming framework for an application at the application layer. The application framework layer may include some predefined functions, such as a function for receiving an event sent by the application framework layer.

As shown in FIG. 1, the application framework layer may include an activity manager (Activity Manager), a window manager (Window Manager), a content provider (Content Provider), a resource manager (Resource Manager), a notification manager (Notification Manager), a view system (View System), and the like.

The activity manager is configured to manage a life cycle of each application.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and a browsing bookmark, an address book, and the like.

The resource manager provides various resources for an application such as a localized character string, an icon, a picture, a layout file, and a video file.

The notification manager enables an application to display notification information in a status bar, and may be used to convey a message of a notification type. The message may automatically disappear after a short stay without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an alert sound is played, an electronic device vibrates, or an indicator light blinks.

The view system may include a visual control, for example, a control for displaying text or a control for displaying a picture. The view system may be configured to construct an application. A display interface may include one or more views. For example, a display interface including an SMS message notification icon may include a text display view and a picture display view.

It should be noted that the application framework layer may further include:

an application history manager (HwAppHistory Manager): The application history manager is configured to manage applications, for example, manage starting and determining of an activity (Activity) in each application, and manage obtaining, displaying, and interaction of a historical browsing page in each application. Herein, system code corresponding to the application history manager may be added to each application in a stub form, so that each application can execute management logic corresponding to the application history manager. In this way, a history management function of each application can be implemented. For example, a stub function may be added to a key location, for example, opening or removing of each activity in each application, so that system code corresponding to the application history manager can be added to a native procedure of each application, and the history management function performed on each application by the application history manager can be implemented.

Figure 2:
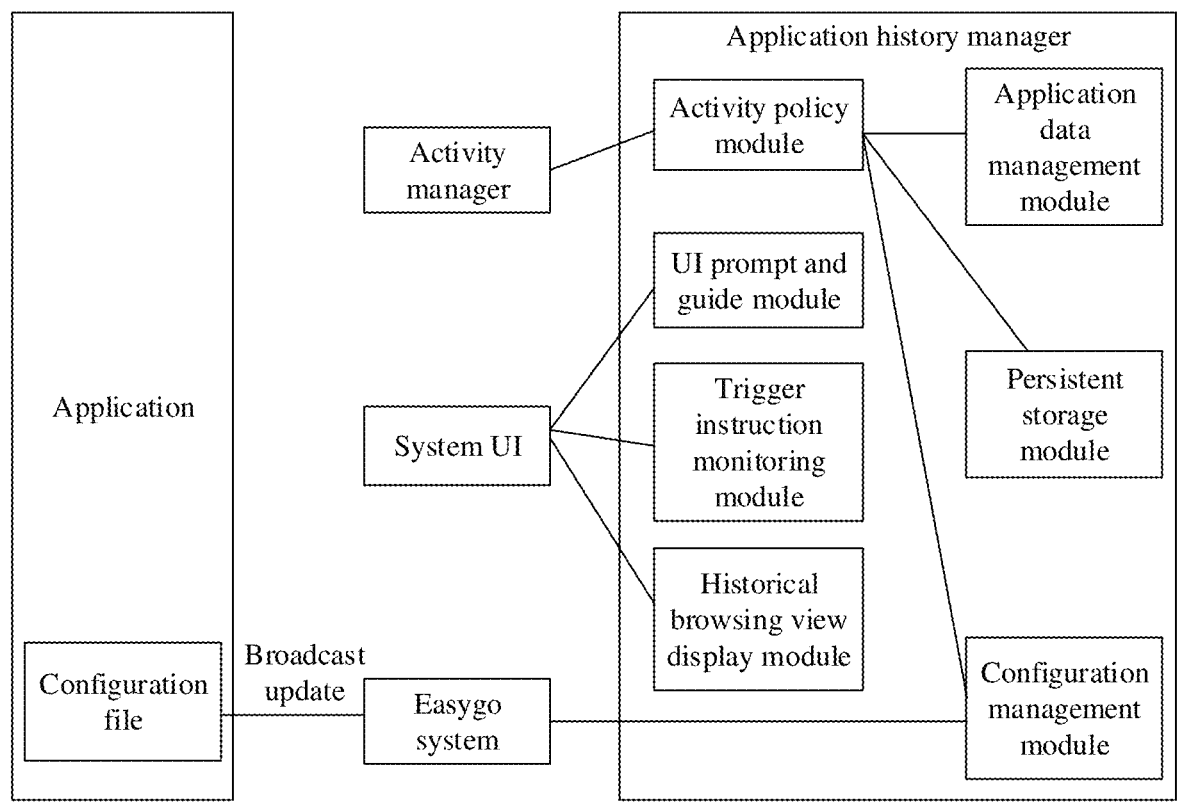
FIG. 2 is a schematic diagram of a structure of an application history manager according to an embodiment of this application.

As shown in FIG. 2, the application history manager may include an application data management module, an activity (Activity) policy management module, a persistent storage module, a configuration management module, an interaction (UI) prompt and guide module, a historical browsing view display module, and a trigger instruction monitoring module.

The application data management module is configured to manage application data, for example, manage user selection data in a setting or use process of each application, and/or manage a whitelist of the application history manager, where the whitelist is a list of applications for which the application history manager can perform a history management function.

It should be understood that the application packages at the application layer may further include a setting (setting) program. As shown in FIG. 3, the whitelist may be added to setting, and therefore an independent function switch for an application corresponding to each whitelist is added, to enable or disable a history management function of an application history manager for each application.

The activity policy module is configured to: when each activity of an application is started, determine, with reference to data in the application data management module and data in the configuration management module, whether page browsing information of a browsing page corresponding to the activity needs to be recorded in a database file, and when each activity is destroyed, determine whether the page browsing information of the browsing page corresponding to the activity needs to be removed from the database file.

The persistent storage module is configured to allocate a database file to each application, which is used to record page browsing information of each application. The page browsing information stored in the database file may include a page thumbnail of a browsing page corresponding to an activity and an enabling component Intent of the activity. The Intent may be used to start the activity corresponding to the page thumbnail, to open the browsing page corresponding to the page thumbnail. To be specific, when the activity policy module determines that page browsing information of a browsing page corresponding to an activity needs to be recorded in a database file, the persistent storage module may store a page thumbnail of the browsing page corresponding to the activity and an Intent for starting the activity. Herein, the persistent storage module can ensure that the page browsing information can be retained after the terminal device is powered off and restarted.

The configuration management module is configured to perform function configuration on each application based on a configuration file of each application, for example, configure whether an application supports the history management function of the application history manager, configure whether an application enables the history management function of the application history manager, and configure a page identifier of a browsing page, in the application, of which page browsing information needs to be recorded. Specifically, a configuration file may be added to an assets directory of each application, and added configuration file may be broadcast. An instant service system (Easygo system) in the Android system may receive and parse the configuration file, so that the configuration management module may perform function configuration on each application based on a parsing result.

The UI prompt and guide module is configured to provide prompt and guide interfaces when each application is started for the first time.

The historical browsing view display module is configured to construct, in a form of a card, a historical browsing view corresponding to the page browsing information stored in the persistent storage module, display the historical browsing view, and further provide a function of entering a browsing page by fast scrolling and tapping.

The trigger instruction monitoring module is configured to monitor a specific trigger instruction, so that the historical browsing view display module can be triggered, according to the trigger instruction, to display the historical browsing view.

It should be understood that the UI prompt and guide module, the historical browsing view display module, and the trigger instruction monitoring module may complete related functions by operating with a system interaction program (system UI) at the application layer.

Herein, the application history manager is added to the application framework layer, so that a history record function in an application can be implemented only by adding a simple configuration file to the application at the application layer without performing complex adaptation, which not only improves user experience, but also reduces access difficulty of a third-party application.

Android runtime schedules and manages the Android system. Android runtime may include a kernel library and a virtual machine. The kernel library may include a functional function that is invoked by the Java language and an Android kernel library. The application layer and the application framework layer run in the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a sensor service module, a physical status identification module, and a three-dimensional graphics processing library (for example, OpenGL ES).

The sensor service module is configured to monitor sensor data uploaded by various types of sensors at a hardware layer, to determine a physical status of the mobile phone.

The physical status identification module is configured to: analyze and identify a user gesture, a face, and the like.

The three-dimensional graphics processing library is configured to implement three-dimensional graphics drawing, image rendering, compositing, layer processing, and the like.

The system library may further include:

a surface manager, configured to manage a display subsystem and provide fusion of 2D and 3D layers for a plurality of applications; and a media library that supports playback and recording in a plurality of commonly used audio and video formats, static image files, and the like, and can support a plurality of audio and video coding formats such as MPEG-4, H.264, MP3, AAC, AMR, JPG, and PNG.

The hardware abstraction layer is a layer between hardware and software. The hardware abstraction layer may include a display driver, a camera driver, a sensor driver, and the like, and is configured to drive related hardware, for example, a display, a camera, and a sensor, at the hardware layer.

FIG. 4 is a schematic flowchart of a page processing method according to an embodiment of this application. By way of example and not limitation, the page processing method may be implemented on a terminal device having the foregoing software structure. As shown in FIG. 4, the page processing method may include the following steps.

S401. When a preset trigger instruction for a currently running application is detected, display a historical browsing view of the application, where the historical browsing view is established based on page browsing information, and the page browsing information includes one or more browsing pages browsed by a user.

It should be understood that the application may be an application provided by a system of the terminal device, or may be an application obtained by the terminal device from a third party, and the application is an application for which function configuration is performed in the terminal device. To be specific, a configuration management module in the terminal device performs function configuration on the application based on a configuration file of the application, so that the application can support a history management function of an application history manager in the terminal device, and the application has a history record function. Therefore, when the user starts the application in the terminal device and browses a page in the application, the terminal device may obtain and store page browsing information that is in the application, and may establish a historical browsing view of the application based on the page browsing information. The page browsing information may include one or more browsing pages browsed by the user, the historical browsing view may be a view formed by arranging the one or more browsing pages, and the constructed historical browsing view may be stored in a database file that is in a local database of the terminal device and that corresponds to the application.

In a possible implementation, the terminal device may set a function switch for the application, and the function switch may be used to enable or disable the history management function of the application. As shown in FIG. 3, the user may enable or disable the function switch based on an actual requirement, to enable or disable the history management function of the application. Therefore, when the application is started, the terminal device may first determine whether the function switch of the application is on. When the function switch of the application is on, the terminal device may determine that the history management function of the application is enabled. In this case, when the user browses a page in the application, the terminal device may obtain page browsing information in the application, and may establish a historical browsing view of the application based on the page browsing information.

It should be understood that the terminal device may preset a preset application state corresponding to the application when the function switch is on. In this way, the terminal device may determine, by obtaining a current application state of the application and determining whether the current application state of the application is the preset application state, whether the function switch of the application is on. Specifically, when the current application state of the application is the preset application state, it indicates that the user turns on the function switch of the application currently. In this case, the terminal device may obtain the page browsing information in the application, and may establish the historical browsing view of the application based on the page browsing information. When the current application state of the application is not the preset application state, in other words, when the user does not turn on the function switch of the application, it indicates that the user does not want to record current browsing behavior. In this case, the terminal device may not record the page browsing behavior of the user in the application.

For example, the function switch of the application may be turned on by default, to record page browsing performed by the user in the application, so as to help quickly return to a browsing page specified by the user. This improves user experience. Certainly, the function switch of the application may be turned off by default. This is not limited in this embodiment of this application.

In a possible implementation, when the user browses a plurality of pages in the application, the terminal device may obtain in real time a page thumbnail corresponding to each browsing page and a browsing time corresponding to each browsing page, and may establish the historical browsing view of the application based on each page thumbnail and each browsing time. Page thumbnails in the historical browsing view may be arranged based on browsing times corresponding to the browsing pages. For example, the page thumbnails may be arranged in the historical browsing view in a reverse chronological order based on the browsing times.

For example, the historical browsing view may include one or more view pages. Each view page may include one or more page thumbnails arranged in a form of cards. The page thumbnail in each view page may be arranged based on a corresponding browsing time. For example, for a browsing page with a later browsing time, a page thumbnail corresponding to the browsing page is arranged in the front of the view page, and for a browsing page with an earlier browsing time, a page thumbnail corresponding to the browsing page is arranged at the rear of the view page.

Herein, a quantity of page thumbnails corresponding to the view page may be determined based on a user setting, or may be determined based on a default setting of the terminal device. For example, in a specific application scenario, the quantity of page thumbnails corresponding to the view page may be 4, and the page thumbnails corresponding to the view page may be those shown in FIG. 5. A browsing time corresponding to a page thumbnail A in the view page is later than a browsing time corresponding to a page thumbnail B, the browsing time corresponding to the page thumbnail B is later than a browsing time corresponding to a page thumbnail C, and the browsing time corresponding to the page thumbnail C is later than a browsing time corresponding to a page thumbnail D.

Figure 5:
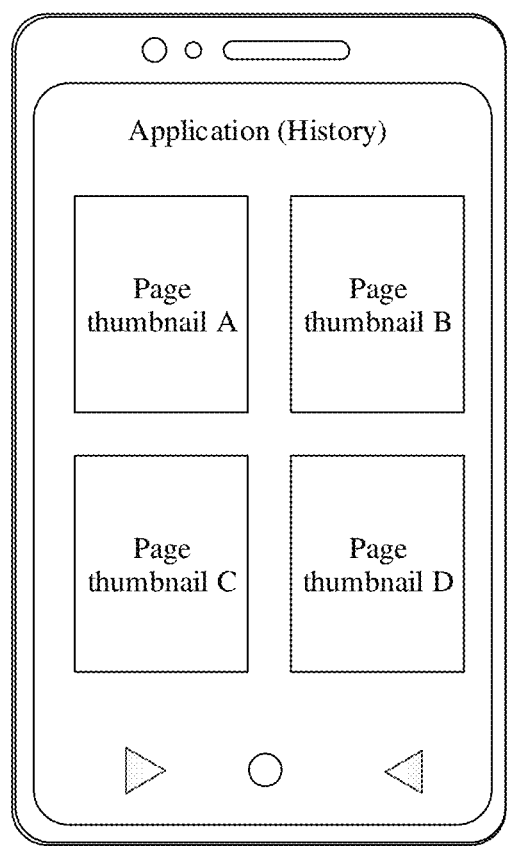
FIG. 5 is a schematic diagram of an example of displaying a historical browsing view according to an embodiment of this application.
Figure 6:
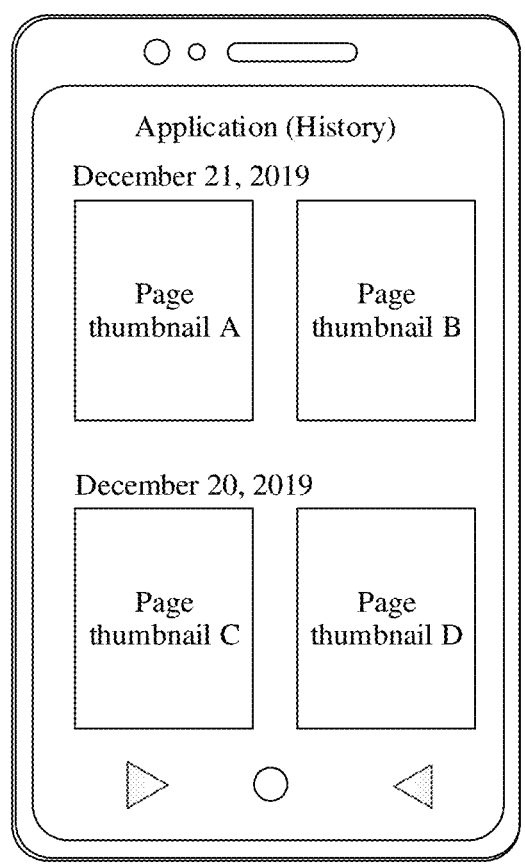
FIG. 6 is a schematic diagram of another example of displaying a historical browsing view according to an embodiment of this application.

For example, when establishing the historical browsing view, the terminal device may further add the browsing time corresponding to each page thumbnail to the established historical browsing view, to help quickly return to a specified browsing page to which the user wants to return. This improves user experience. For example, the terminal device may add the browsing time corresponding to each page thumbnail to the view page shown in FIG. 5, and then a view page shown in FIG. 6 is obtained.

It should be noted that, when the historical browsing view includes a plurality of view pages, the user may switch between the view pages based on a specific situation. For example, as shown in FIG. 5, the user may switch between the view pages by tapping a virtual button (for example, a triangle icon) on the view page, to switch to a next view page or return to a previous view page. For example, the user may alternatively switch between the view pages by tapping a touch control button on the terminal device, for example, by tapping a touch control button on a side of the terminal device.

Figure 7:
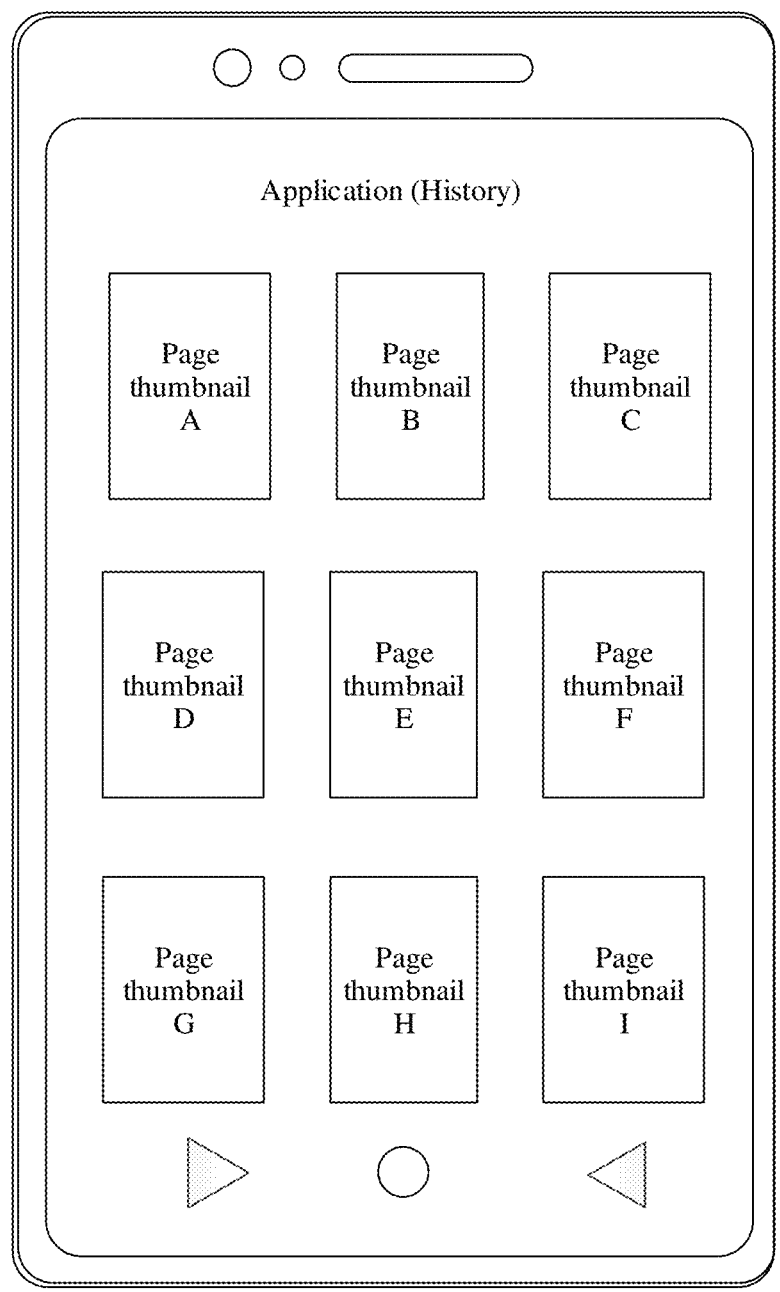
FIG. 7 is a schematic diagram of still another example of displaying a historical browsing view according to an embodiment of this application.

For example, image sizes of the page thumbnails corresponding to the browsing pages may be the same. Specifically, the terminal device may determine an image size of a page thumbnail based on a size of a screen of the terminal device and the quantity of page thumbnails corresponding to the view page in the historical browsing view. As shown in FIG. 5, when the quantity of page thumbnails corresponding to the view page in the historical browsing view is 4, the terminal device may determine the image size of the page thumbnail as one third of the size of the screen (to be specific, a length of the page thumbnail is one third of a length of the screen, and a width of the page thumbnail is one third of a width of the screen). As shown in FIG. 7, when the quantity of page thumbnails corresponding to the view page in the historical browsing view is 9, the terminal device may determine the image size of the page thumbnail as a quarter of the screen size (to be specific, a length of the page thumbnail is a quarter of a length of the screen, and a width of the page thumbnail is a quarter of a width of the screen).

It should be noted that the determining the image size is merely an example for explanation, and should not be understood as a limitation on this embodiment of this application. In this embodiment of this application, the terminal device may determine the image size as another value in another manner. For example, the terminal device may determine the image size of the page thumbnail based on a user-defined setting, or may determine the image size of the page thumbnail based on a default setting of the terminal device. This is not limited in this embodiment of this application.

Figure 8:
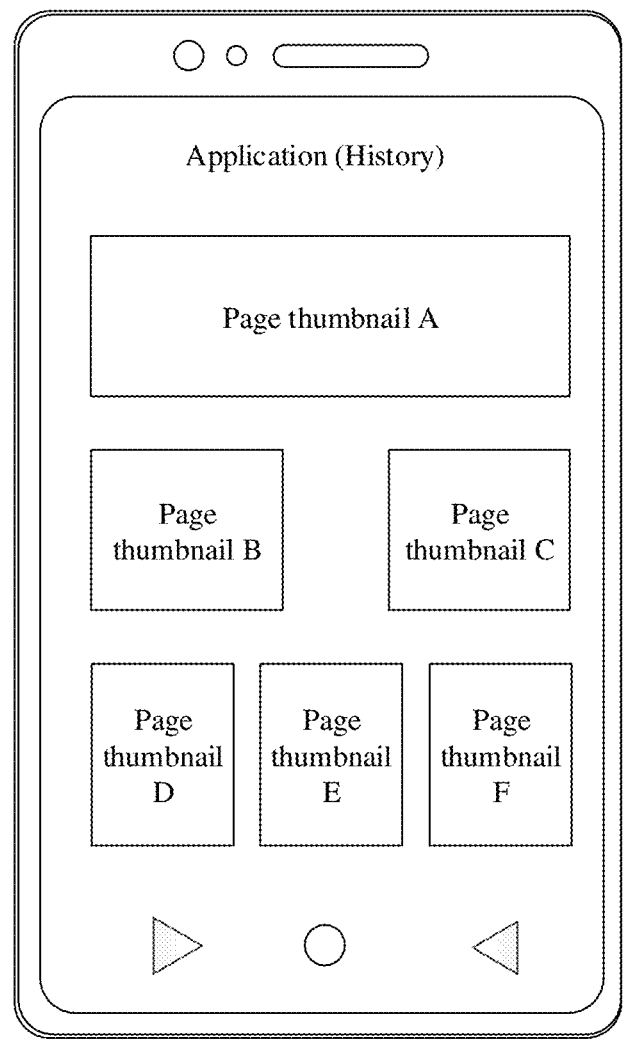
FIG. 8 is a schematic diagram of yet another example of displaying a historical browsing view according to an embodiment of this application.

As shown in FIG. 8, the image sizes of the page thumbnails corresponding to the browsing pages may alternatively be different, so that the browsing pages are displayed differentially, which helps the user to quickly locate a target browsing page that the user eventually wants to return to.

For example, the terminal device may determine the image size of each page thumbnail based on the browsing time corresponding to each browsing page. Specifically, a browsing page with a later browsing time indicates a larger image size of a page thumbnail corresponding to the browsing page, and a browsing page with an earlier browsing time indicates a smaller image size of a page thumbnail corresponding to the browsing page.

For example, the terminal device may alternatively determine the image size of each page thumbnail based on browsing duration corresponding to each browsing page. Specifically, a browsing page with longer browsing duration indicates a larger image size of a page thumbnail corresponding to the browsing page, and a browsing page with shorter browsing duration indicates a smaller image size of a page thumbnail corresponding to the browsing page.

For example, the terminal device may alternatively determine the image size of each page thumbnail based on browsing popularity corresponding to each browsing page. Herein, the browsing popularity may be determined based on a quantity of times of browsing a browsing page. A larger quantity of times of browsing indicates higher browsing popularity, and a smaller quantity of times of browsing indicates lower browsing popularity. Specifically, a browsing page with higher browsing popularity indicates a larger image size of a page thumbnail corresponding to the browsing page, and a browsing page with lower browsing popularity indicates a smaller image size of a page thumbnail corresponding to the browsing page.

It should be understood that the user may browse an invalid page in the application (for example, browse an advertisement page embedded in the application), and the invalid page browsed by the user is usually not the browsing page that the user wants to return to. Therefore, to ensure simplicity and efficiency of the historical browsing view, and help the user to quickly find the browsing page that the user wants to return to, the terminal device may establish the historical browsing view based on page browsing information corresponding to only a valid browsing page.

Specifically, the terminal device may configure, in advance based on the configuration file of the application, a preset page identifier corresponding to the valid browsing page. There may be one or more preset page identifiers. The preset page identifier and a subsequent page identifier each may be a page name corresponding to a browsing page, and the page name may be a name of an activity corresponding to the browsing page. In this case, when the user browses a page in the application, the terminal device may obtain, in real time, a page identifier of the page browsed by the user, and may determine whether the page identifier of the browsing page is the preset page identifier. When the page identifier of the browsing page is the preset page identifier, the terminal device may determine the browsing page as a first target browsing page, and may establish the historical browsing view of the application based on a first page thumbnail and a first browsing time corresponding to the first target browsing page, to avoid that the established historical browsing view includes all browsing pages browsed by the user, and effectively reduce the quantity of page thumbnails in the historical browsing view, which helps quickly return to a browsing page specified by the user. In this way, user experience is improved.

For example, when the user browses a page A, a page B, a page C, a page D, and a page E in the application, and the terminal device determines that a page identifier A of the page A, a page identifier D of the page D, and a page identifier E of the page E are preset page identifiers, and determines that a page identifier B of the page B and a page identifier C of the page C are page identifiers corresponding to advertisement pages, the terminal device may determine that the page A, the page D, and the page E are first target browsing pages (namely, valid browsing pages). In this case, the terminal device may establish the historical browsing view of the application based on first page thumbnails and first browsing times that correspond to the page A, the page D, and the page E.

For example, when the user browses a page in the application, the terminal device may obtain, in real time, page content of the page browsed by the user, and may obtain a second target browsing page by performing content analysis on the page content. Specifically, a browsing page whose page content meets a preset condition may be determined as the second target browsing page, and the historical browsing view of the application may be established based on a second page thumbnail and a second browsing time corresponding to the second target browsing page, to effectively reduce the quantity of page thumbnails in the historical browsing view, which helps quickly return to a browsing page specified by the user. In this way, user experience is improved. The preset condition may be a condition corresponding to a product details page or a content details page.

Herein, the terminal device may limit the quantity of page thumbnails in the historical browsing view based on a user setting or a default system setting, to save storage space of the terminal device and ensure real-time performance and effectiveness of the historical browsing view. This improves user experience. For example, the terminal device may limit the quantity of page thumbnails in the historical browsing view to 20 based on a user setting, in other words, the terminal device may record page thumbnails corresponding to only 20 browsing pages in the application in real time. To be specific, when the quantity of page thumbnails that are recorded by the terminal device and that are in the application reaches 20, but the user still browses a page in the application, the terminal device may record a new page thumbnail by deleting an old page thumbnail, to ensure real-time performance and effectiveness of the historical browsing view. This improves user experience.

It should be noted that the terminal device may also clean and delete the historical browsing view or the corresponding browsing page in the historical browsing view in real time, to release the storage space of the terminal device. For example, when storage duration of a page thumbnail in the historical browsing view reaches a duration threshold, the terminal device may delete the page thumbnail in the historical browsing view and a browsing page corresponding to the page thumbnail, where the duration threshold may be determined based on an actual situation. For example, the duration threshold may be determined to be one week, one month, or the like. For example, when the terminal device receives a cleaning operation performed by the user on the historical browsing view or a page thumbnail in the historical browsing view, the terminal device may delete the historical browsing view or the page thumbnail in the historical browsing view and a browsing page corresponding to the page thumbnail.

It should be understood that, when the user needs to return to a browsing page in the application, the user may obtain the historical browsing view of the application by entering a preset trigger instruction. The preset trigger instruction may be an instruction generated by triggering a preset button, or may be an instruction generated by triggering a preset gesture, or may be an instruction generated by triggering a preset gesture by using a specific body part, or may be an instruction generated by triggering a preset voice keyword. This is not limited in this embodiment of this application.

For example, in the terminal device, it may be preset that the preset trigger instruction is generated when a "multi-task" button is triggered three times in a running process of the application, or it may be preset that the preset trigger instruction is generated when the "multi-task" button and a "volume +" button are simultaneously triggered in the running process of the application, or it may be preset that the preset trigger instruction is generated when a slide button on a side of the terminal device is triggered in the running process of the application. In this case, when the user presses the "multi-task" button three times, or the user simultaneously presses the "multi-task" button and the "volume +" button, or the user slides the slide button on the side of the terminal device in the running process of the application, the terminal device may generate and obtain the preset trigger instruction.

For example, in the terminal device, it may be preset that the preset trigger instruction is generated when a preset gesture such as an M-shaped gesture is collected in the running process of the application. In this case, in the running process of the application, when the user enters a gesture that matches the preset gesture such as the M-shaped gesture, the terminal device may generate and obtain the preset trigger instruction.

For example, in the terminal device, it may be further preset that the preset trigger instruction is generated when the preset gesture such as the M-shaped gesture made with a knuckle is collected in the running process of the application. In this case, in the running process of the application, when the user enters a gesture that matches the preset gesture such as the M-shaped gesture with a knuckle, the terminal device may generate and obtain the preset trigger instruction.

For example, it may be further preset in the terminal device that the preset trigger instruction is generated when a preset voice keyword such as "return to the page" is detected in the running process of the application. In this case, when voice entered by the user includes the preset voice keyword such as "return to the page", the terminal device may generate and obtain the preset trigger instruction.

It should be noted that, when the historical browsing view includes a plurality of view pages, the terminal device may arrange the view pages based on browsing times corresponding to browsing pages in the view pages. A view page that includes a browsing page corresponding to a later browsing time is arranged in the front, and a view page that includes a browsing page corresponding to an earlier browsing time is arranged at the rear. In this case, when displaying the historical browsing view according to the preset trigger instruction entered by the user, the terminal device may preferentially display the view page that is arranged in the front, and may switch between the view pages according to a switching instruction or based on preset duration. It should be understood that the preset duration may be understood as duration preset in the terminal device, for example, may be understood as duration such as 20 seconds or 30 seconds preset in the terminal device.

As shown in FIG. 5, when displaying the historical browsing view in a display interface, the terminal device may further provide, in the display interface, a virtual button (for example, a triangle icon) for the user to switch between the view pages, and the user may switch between the view pages by tapping the virtual button. For example, the user may switch to a next view page or return to a previous view page by tapping the virtual button.

For example, the terminal device may also automatically switch between the view pages when display duration of the view page reaches the preset duration. For example, when display duration of a view page reaches the preset duration (for example, 30 seconds), the terminal device may automatically switch to a next view page. It should be understood that the operation of automatically switching between view pages by the terminal device may be performed cyclically, in other words, when display duration of a last view page in the historical browsing view reaches the preset duration, the terminal device may automatically switch to a first view page in the historical browsing view.

S402. Return, in response to a selection operation performed by the user in the historical browsing view, to a target browsing page corresponding to the selection operation.

Specifically, in a process of displaying the historical browsing view, the user may return, by performing the selection operation, to the target browsing page selected in the selection operation. In this way, quick returning to the target browsing page is implemented and user experience is improved.

It should be understood that, when there are a large quantity of browsing pages in the historical browsing view, the user usually needs to switch between view pages a plurality of times to search for the target browsing page that the user eventually wants to return to, which results in low page returning efficiency and reduces user experience.

In a possible implementation, to improve the page returning efficiency and user experience, after establishing the historical browsing view of the application based on the page browsing information, the terminal device may further first obtain the page content corresponding to each browsing page in the page browsing information, determine a page keyword corresponding to each browsing page based on the page content, and associate each determined page keyword with a page thumbnail corresponding to each browsing page, so that the page keyword serves as an index of each page thumbnail.

It should be noted that, the page content corresponding to the browsing page may include text content of the browsing page, and may also include title content of the browsing page. For example, the terminal device may perform keyword extraction on the text content of each browsing page, and/or may perform keyword extraction on the title content of each browsing page, and an extracted keyword may be determined as the page keyword corresponding to each browsing page. Herein, the terminal device may use an existing keyword extraction method to extract the keyword from the text content and/or the title content. This is not limited in this embodiment of this application.

Figure 9:
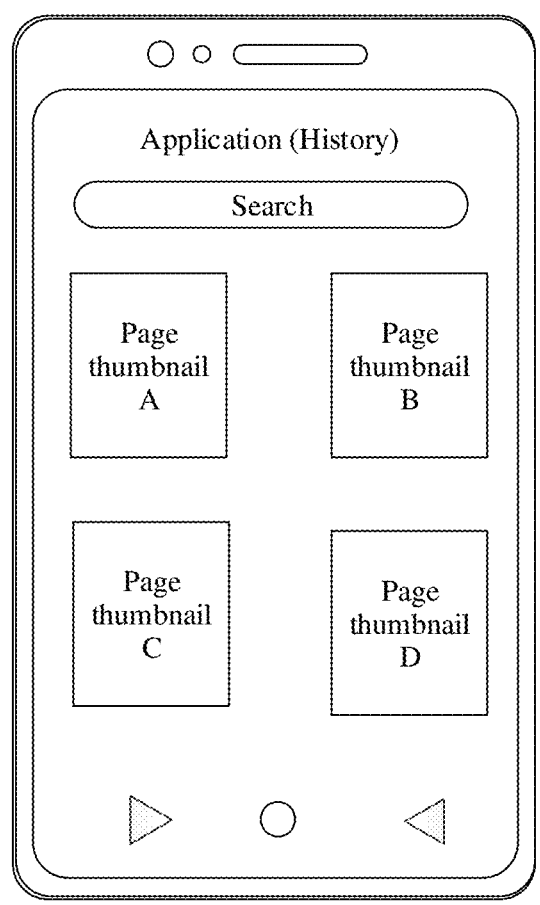
FIG. 9 is a schematic diagram of still yet another example of displaying a historical browsing view according to an embodiment of this application.

As shown in FIG. 9, when displaying the historical browsing view, the terminal device may further provide a search box in the display interface for displaying the historical browsing view. The user may enter a search keyword in the search box. After receiving the search keyword entered by the user, the terminal device may match a target page keyword corresponding to the search keyword, and obtain and display a third page thumbnail associated with the target page keyword. The user may quickly return to a corresponding target browsing page by tapping the third page thumbnail. The target page keyword is one or more of page keywords corresponding to each browsing page. Herein, by searching, the user can quickly locate the target browsing page that the user wants to return to. In this way, user experience is improved.

For example, after obtaining the third page thumbnail associated with the target page keyword, the terminal device may also directly jump to and display the target browsing page corresponding to the third page thumbnail, to implement quick returning of the browsing page. This improves user experience.

It should be understood that the terminal device may further associate the browsing time corresponding to each browsing page with the page thumbnail corresponding to each browsing page, so that the browsing time serves as an index of each page thumbnail. Therefore, when the page of the terminal displays the historical browsing view, the user may enter a search time in the foregoing search box. After receiving the search time entered by the user, the terminal device may match a target browsing time corresponding to the search time, and may obtain and display a page thumbnail corresponding to the target browsing time, so that the user can quickly return to the target browsing page specified by the user. The target browsing time is a browsing time corresponding to any browsing page.

In this embodiment of this application, when the user browses a page in the application, the terminal device may obtain page browsing information in the application, and may establish the historical browsing view of the application based on the obtained page browsing information. When detecting the preset trigger instruction for the application, the terminal device may directly display the historical browsing view, and may return, based on the selection operation performed by the user in the historical browsing view, to the target browsing page selected in the selection operation. In this way, a page returning operation is simplified, and the user can easily and quickly return to the browsing page specified by the user, which improves user experience.

In a possible manner, to implement data sharing between applications and strengthen an association between the applications, the terminal device may be a terminal device capable of split-screen display, to be specific, the display screen of the terminal device may be divided into two or more display areas, and each display area may display an application. The following uses an example in which the display screen is divided into two display areas for description.

Figure 10:
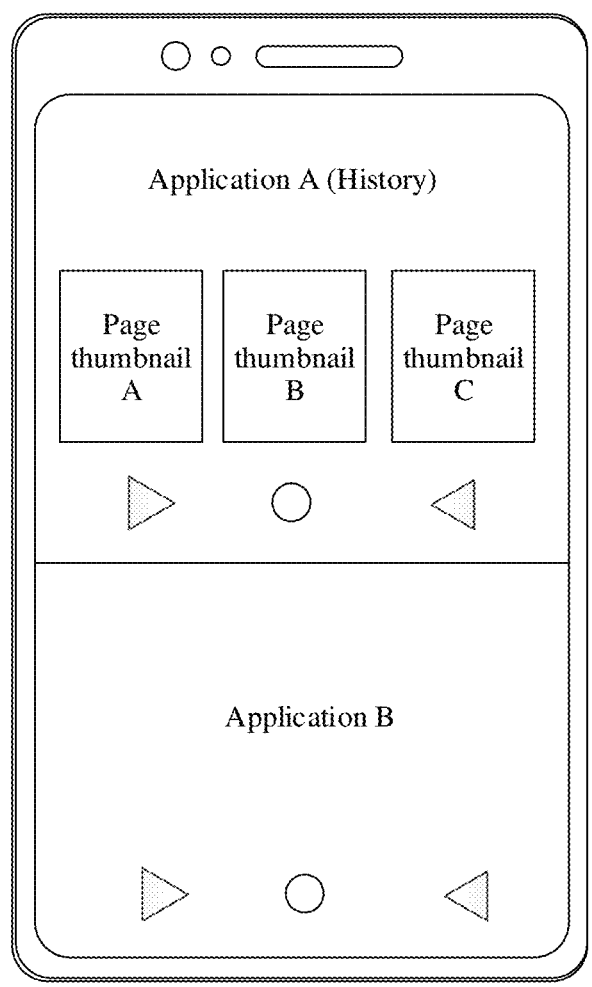
FIG. 10 is a schematic diagram of a further example of displaying a historical browsing view according to an embodiment of this application.

Herein, when the display screen of the terminal device is divided into a first display area and a second display area, the first display area may be configured to display a first application (for example, an application A), and the second display area may be configured to display a second application (for example, an application B), so that the user can browse the first application and the second application simultaneously in the terminal device. When the user browses the first application and the second application simultaneously, the terminal device may obtain first page browsing information in the first application and second page browsing information in the second application simultaneously. The terminal device may establish a first historical browsing view of the first application based on the first page browsing information, and may establish a second historical browsing view of the second application based on the second page browsing information. When detecting the preset trigger instruction entered by the user, the terminal device may display the first historical browsing view in the first display area, as shown in FIG. 10, or may display the second historical browsing view in the second display area.

It should be understood that, when displaying the first historical browsing view and/or displaying the second historical browsing view, the terminal device may display, based on a selection operation performed by the user in the first historical browsing view and/or the second historical browsing view, a third target browsing page that is selected in the selection operation in the first display area, and/or a fourth target browsing page that is selected in the selection operation in the second display area. In addition, the terminal device may further drag, based on a dragging operation performed by the user, a fourth page thumbnail in the first historical browsing view to the second application, or drag a fifth page thumbnail in the second historical browsing view to the first application. For example, the fourth page thumbnail (for example, a page thumbnail corresponding to a historical browsing page) in the first historical browsing view may be dragged to the second application (for example, an instant messaging program) based on the dragging operation performed by the user for sending, to implement data sharing between the applications. This improves user experience.

Figure 11:
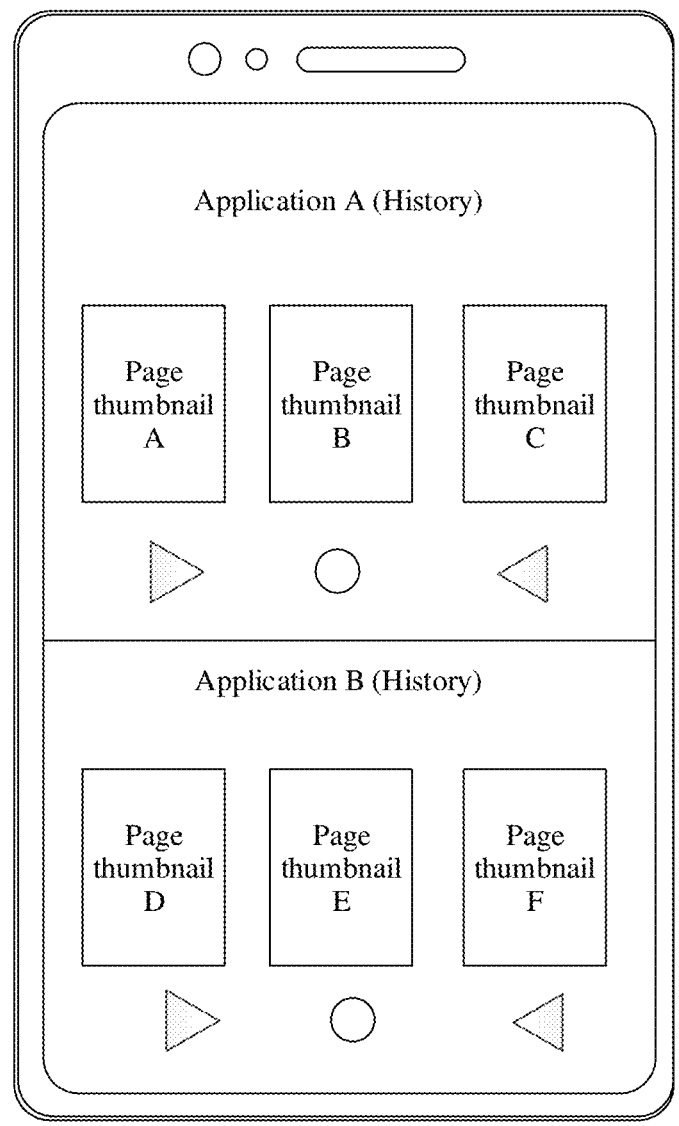
FIG. 11 is a schematic diagram of a still further example of displaying a historical browsing view according to an embodiment of this application.

As shown in FIG. 11, when detecting the preset trigger instruction entered by the user, the terminal device may further display the first historical browsing view and the second historical browsing view simultaneously, and may drag the fourth page thumbnail to the fifth page thumbnail based on the dragging operation performed by the user between the first historical browsing view and the second historical browsing view, where the fourth page thumbnail is any page thumbnail in the first historical browsing view, and the fifth page thumbnail is any page thumbnail in the second historical browsing view. In addition, when the user selects the fifth page thumbnail for returning, a fifth target browsing page including the fourth page thumbnail may be displayed, where the fifth target browsing page is a browsing page corresponding to the fifth page thumbnail. For example, a historical chat record page in the first application (for example, an instant messaging program) may be dragged to a note page in the second application (for example, a note program) based on the dragging operation performed by the user. When the user opens the note page, the terminal device may display the historical chat record page when displaying content of the note page, to implement data sharing between the applications. This improves user experience.

It should be understood that sequence numbers of the steps do not mean an execution sequence in the foregoing embodiments. The execution sequence of the processes should be determined based on functions and internal logic of the processes, and should not constitute any limitation on the implementation processes of embodiments of this application.

Figure 12:
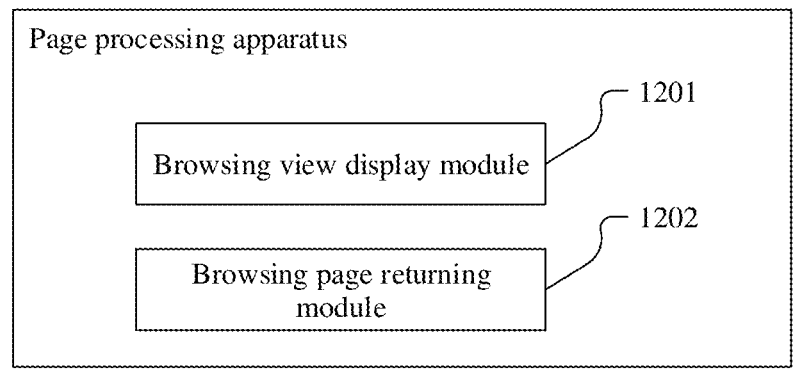
FIG. 12 is a schematic diagram of a structure of a page processing apparatus according to an embodiment of this application.

Corresponding to the page processing method in the foregoing embodiments, FIG. 12 is a block diagram of a structure of a page processing apparatus according to an embodiment of this application. For ease of description, only parts related to the embodiment of this application are shown.

Refer to FIG. 12. The page processing apparatus may include:

a browsing view display module 1201, configured to: when a preset trigger instruction for a currently running application is detected, display a historical browsing view of the application, where the historical browsing view is established based on page browsing information, and the page browsing information includes one or more browsing pages browsed by a user; and a browsing page returning module 1202, configured to: in response to a selection operation performed by the user in the historical browsing view, return to a target browsing page corresponding to the selection operation, where the target browsing page is any of the browsing pages.

Optionally, the page processing apparatus may further include:

an application state obtaining module, configured to obtain a current application state of the application; and a browsing view establishment module, configured to: when the current application state is a preset application state, obtain the page browsing information in the application, and establish the historical browsing view of the application based on the page browsing information.

For example, when the page browsing information includes a plurality of browsing pages browsed by the user, the browsing view establishment module may include:

a first browsing view establishment unit, configured to: obtain page thumbnails corresponding to the browsing pages and browsing times corresponding to the browsing pages in the page browsing information, and establish the historical browsing view of the application based on the page thumbnails and the browsing times, where the page thumbnails in the historical browsing view are arranged based on the browsing times.

In a possible implementation, the first browsing view establishment unit may include:

a page identifier obtaining subunit, configured to obtain a page identifier corresponding to each browsing page in the page browsing information;

a first target page determining subunit, configured to determine a first target browsing page based on the page identifier and a preset page identifier in the application, and obtain a first page thumbnail corresponding to the first target browsing page and a first browsing time corresponding to the first target browsing page; and a first browsing view establishment subunit, configured to establish the historical browsing view of the application based on the first page thumbnail and the first browsing time.

In another possible implementation, the first browsing view establishment unit may further include:

a page content obtaining subunit, configured to obtain page content corresponding to each browsing page in the page browsing information;

a second target page determining subunit, configured to determine a second target browsing page based on the page content, and obtain a second page thumbnail corresponding to the second target browsing page and a second browsing time corresponding to the second target browsing page; and a second browsing view establishment subunit, configured to establish the historical browsing view of the application based on the second page thumbnail and the second browsing time.

Optionally, the page processing apparatus may further include:

a page keyword determining module, configured to obtain page content corresponding to each browsing page in the page browsing information, and determine a page keyword corresponding to each page thumbnail based on each piece of page content; and a page searching module, configured to: when a search keyword entered by the user is received, obtain and display a third page thumbnail based on the search keyword and the page keyword, where the third page thumbnail is any of the page thumbnails.

For example, the browsing view establishment module may further include:

a browsing information obtaining unit, configured to obtain first page browsing information in a first application and second page browsing information in a second application; and a second browsing view establishment unit, configured to establish a first historical browsing view of the first application based on the first page browsing information, and establish a second historical browsing view of the second application based on the second page browsing information; and the browsing view display module 1201 is further configured to display the first historical browsing view of the first application and the second historical browsing view of the second application.

In a possible implementation, the page processing apparatus may further include:

a dragging module, configured to drag a fourth page thumbnail to a fifth page thumbnail based on a dragging operation performed by the user between the first historical browsing view and the second historical browsing view, where the fourth page thumbnail is any page thumbnail in the first historical browsing view, and the fifth page thumbnail is any page thumbnail in the second historical browsing view; and the browsing page returning module 1202 is further configured to return, in response to a selection operation performed by the user on the fifth page thumbnail, to a fifth target browsing page that includes the fourth page thumbnail, where the fifth target browsing page is a browsing page corresponding to the fifth page thumbnail.

It should be noted that content such as information exchange between the foregoing apparatuses/units and an execution process is based on a same concept as that in the method embodiments of this application. For specific functions and technical effects of the content, refer to the method embodiments. Details are not described herein again.

A person skilled in the art may clearly understand that, for the purpose of convenient and brief description, division into the foregoing functional units and modules is merely used as an example for description. In an actual application, the foregoing functions may be allocated to different functional units and modules for implementation according to a requirement. That is, an inner structure of the apparatus is divided into different functional units or modules, to implement all or some of the functions described above. Functional units and modules in the embodiments may be integrated into one processing unit, or each of the units may exist alone physically, or two or more units may be integrated into one unit. The integrated unit may be implemented in a form of hardware, or may be implemented in a form of a software functional unit. In addition, specific names of the functional units and modules are merely provided for the purpose of distinguishing between the units or modules, but are not intended to limit the protection scope of this application. For a specific working process of the units and modules in the foregoing system, refer to a corresponding process in the foregoing method embodiments. Details are not described herein again.

Figure 13:
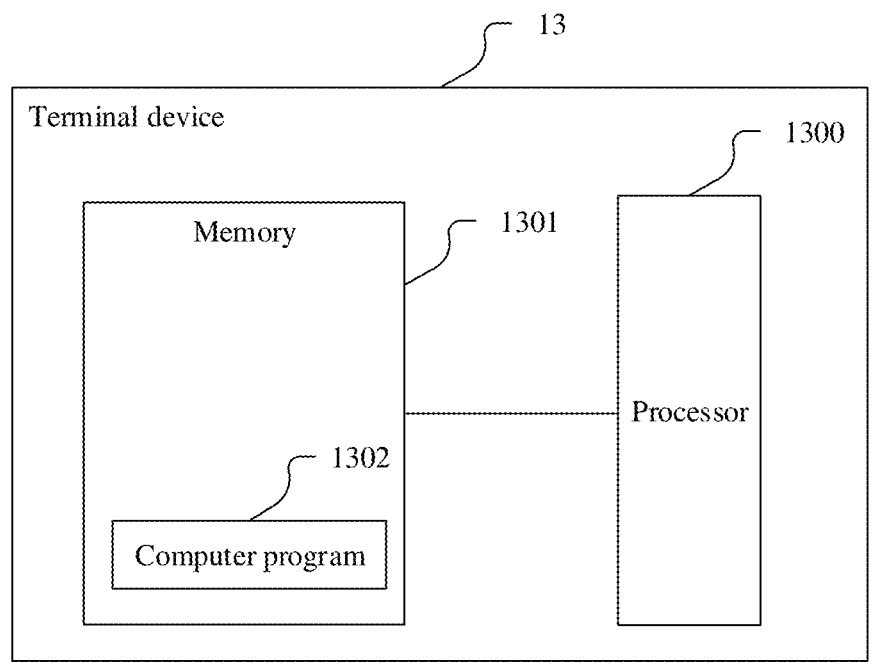
FIG. 13 is a schematic diagram of a structure of a terminal device according to an embodiment of this application.

FIG. 13 is a schematic diagram of a structure of a terminal device according to an embodiment of this application. As shown in FIG. 13, the terminal device 13 in this embodiment includes: at least one processor 1300 (only one processor is shown in FIG. 13), a memory 1301, and a computer program 1302 that is stored in the memory 1301 and that can be run on the at least one processor 1300. When executing the computer program 1302, the processor 1300 implements steps in any one of the foregoing embodiments of the page processing method.

The terminal device 13 may be a computing device such as a desktop computer, a notebook computer, a palmtop computer, or a cloud server. The terminal device may include but is not limited to including the processor 1300 and the memory 1301. A person skilled in the art may understand that FIG. 13 is merely an example of the terminal device 13, and does not constitute a limitation on the terminal device 13. The terminal device may include more or fewer components than those shown in the figure, or some components may be combined, or different components may be used. For example, the terminal device may further include an input/output device, a network access device, or the like.

The processor 1300 may be a central processing unit (Central Processing Unit, CPU). The processor 1300 may alternatively be another general-purpose processor, a digital signal processor (Digital Signal Processor, DSP), an application-specific integrated circuit (Application Specific Integrated Circuit, ASIC), a field-programmable gate array (Field-Programmable Gate Array, FPGA) or another programmable logic device, a discrete gate or a transistor logic device, or a discrete hardware component. The general-purpose processor may be a microprocessor, or the processor may be any conventional processor or the like.

In some embodiments, the memory 1301 may be an internal storage unit of the terminal device 13, for example, a hard disk drive or an internal storage of the terminal device 13. In some other embodiments, the memory 1301 may alternatively be an external storage device of the terminal device 13, for example, a removable hard disk, a smart media card (Smart Media Card, SMC), a secure digital (Secure Digital, SD) card, a flash card (Flash Card), or the like that is provided on the terminal device 13. Further, the memory 1301 may alternatively include both the internal storage unit and the external storage device of the terminal device 13. The memory 1301 is configured to store an operating system, an application, a boot loader (Boot Loader), data, another program, and the like, for example, program code of the computer program. The memory 1301 may further be configured to temporarily store data that has been output or is to be output.

Figure 14:
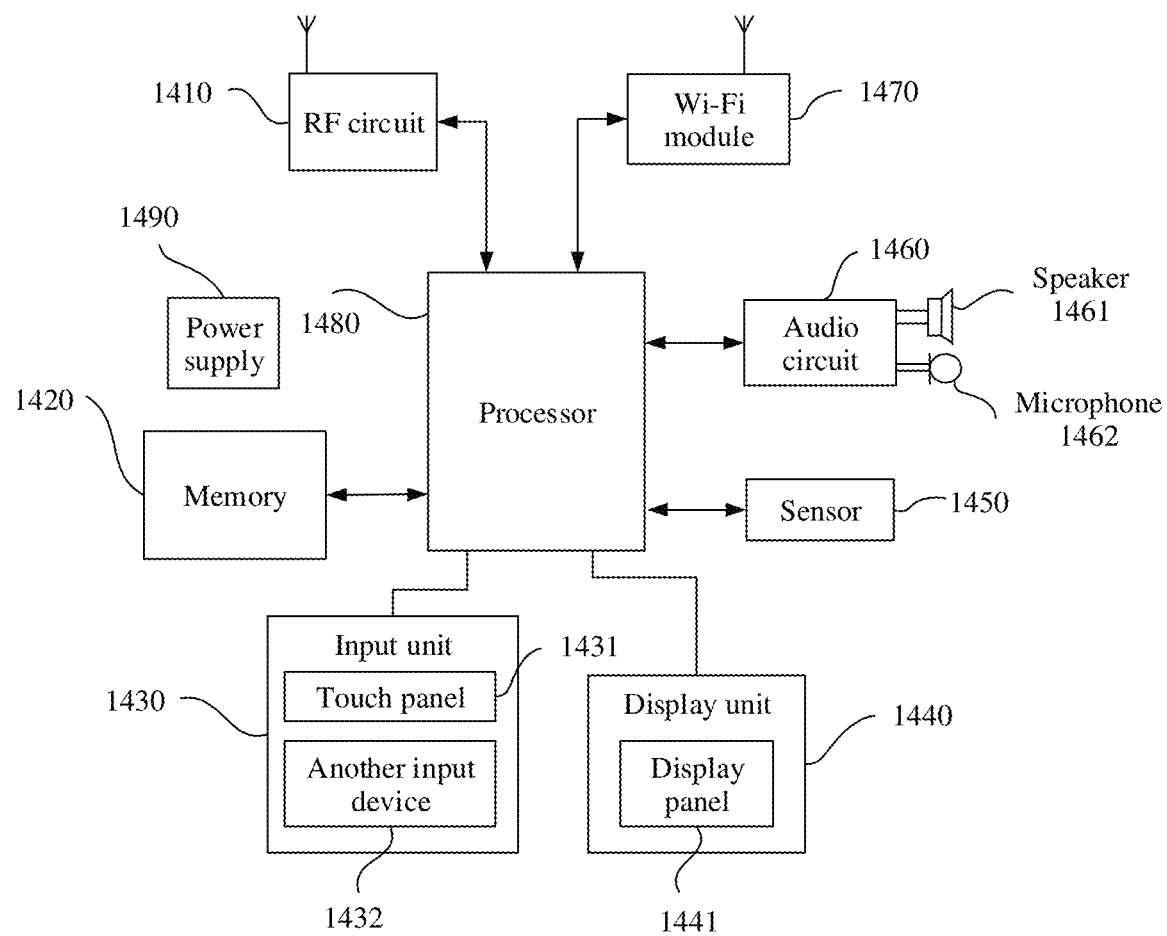
FIG. 14 is a schematic diagram of a structure of a mobile phone to which a page processing method is applicable according to an embodiment of this application.

For example, the terminal device in this embodiment of this application may be a mobile phone, a tablet computer, a wearable device, or the like. For example, the terminal device is a mobile phone. FIG. 14 is a block diagram of a partial structure of the mobile phone according to an embodiment of this application. Refer to FIG. 14. The mobile phone may include components such as a radio frequency (Radio Frequency, RF) circuit 1410, a memory 1420, an input unit 1430, a display unit 1440, a sensor 1450, an audio circuit 1460, a wireless fidelity (wireless fidelity, Wi-Fi) module 1470, a processor 1480, and a power supply 1490. A person skilled in the art may understand that a structure of the mobile phone shown in FIG. 14 constitutes no limitation on the mobile phone. The mobile phone may include more or fewer components than those shown in the figure, or some components may be combined, or a different component layout may be used.

The following specifically describes the components of the mobile phone with reference to FIG. 14.

The RF circuit 1410 may be configured to: receive and send a signal in an information receiving and sending process or during a call; particularly, after receiving downlink information of a base station, send the downlink information to the processor 1480 for processing; and send related uplink data to the base station. Usually, an RF circuit includes but is not limited to including an antenna, at least one amplifier, a transceiver, a coupler, a low noise amplifier (Low Noise Amplifier, LNA), a duplexer, and the like. In addition, the RF circuit 1410 may further communicate with a network and another device through wireless communication. Any communications standard or protocol may be used for the wireless communication, including but not limited to a global system for mobile communication (Global System of Mobile communication, GSM), a general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), an email, a short message service (Short Messaging Service, SMS), and the like.

The memory 1420 may be configured to store a software program and a module. The processor 1480 performs various function applications of the mobile phone and data processing by running the software program and the module that are stored in the memory 1420. The memory 1420 may mainly include a program storage area and a data storage area. The program storage area may store an operating system, an application required by at least one function (such as a voice play function or an image play function), and the like. The data storage area may store data (such as audio data or a phone book) that is created based on use of the mobile phone, and the like. In addition, the memory 1420 may include a high-speed random access memory, and may further include a nonvolatile memory, such as at least one magnetic disk storage component, a flash memory component, or another volatile solid-state storage component.

The input unit 1430 may be configured to: receive input digit or character information, and generate key signal input related to a user setting and function control of the mobile phone. Specifically, the input unit 1430 may include a touch panel 1431 and another input device 1432. The touch panel 1431 is also referred to as a touchscreen and can collect a touch operation performed by a user on or near the touch panel 1431 (for example, an operation performed by the user on or near the touch panel 1431 by using any appropriate object or accessory, such as a finger or a stylus), and drive a corresponding connected apparatus based on a preset program. Optionally, the touch panel 1431 may include two parts: a touch detection apparatus and a touch controller. The touch detection apparatus detects a touch location of the user, detects a signal generated by a touch operation, and sends the signal to the touch controller. The touch controller receives touch information from the touch detection apparatus, converts the touch information into touch point coordinates, then sends the touch point coordinates to the processor 1480. In addition, the touch controller can receive and execute a command sent by the processor 1480. In addition, the touch panel 1431 may be implemented in a plurality of types, such as a resistive type, a capacitive type, an infrared ray, and a surface acoustic wave. In addition to the touch panel 1431, the input unit 1430 may include the another input device 1432. Specifically, the another input device 1432 may include but is not limited to one or more of a physical keyboard, a functional key (for example, a volume control key or an on/off key), a trackball, a mouse, an operating lever, and the like.

The display unit 1440 may be configured to display information entered by the user or information provided for the user, and various menus of the mobile phone. The display unit 1440 may include a display panel 1441. Optionally, the display panel 1441 may be configured in a form of a liquid crystal display (Liquid Crystal Display, LCD), an organic light-emitting diode (Organic Light-Emitting Diode, OLED), or the like. Further, the touch panel 1431 may cover the display panel 1441. When detecting a touch operation on or near the touch panel 1431, the touch panel 1431 transmits the touch operation to the processor 1480 to determine a type of the touch event, and then the processor 1480 provides corresponding visual output on the display panel 1441 based on the type of the touch event. In FIG. 14, the touch panel 1431 and the display panel 1441 are used as two independent parts to implement input and input functions of the mobile phone. However, in some embodiments, the touch panel 1431 and the display panel 1441 may be integrated to implement the input and output functions of the mobile phone.

The mobile phone may further include at least one sensor 1450, such as a light sensor, a motion sensor, or another sensor. Specifically, the light sensor may include an ambient light sensor and a proximity sensor. The ambient light sensor may adjust luminance of the display panel 1441 based on brightness of ambient light, and the proximity sensor may turn off the display panel 1441 and/or backlight when the mobile phone moves to an ear of the user. As a type of the motion sensor, an accelerometer sensor may detect acceleration values in various directions (usually on three axes). The accelerometer sensor may detect a value and a direction of gravity when the accelerometer sensor is stationary, and may be applied to an application for recognizing a mobile phone posture (such as switching between a landscape mode and a portrait mode, a related game, and magnetometer posture calibration), a function related to vibration recognition (such as a pedometer and a knock), and the like. Other sensors such as a gyroscope, a barometer, a hygrometer, a thermometer, and an infrared sensor may be further provided in the mobile phone. Details are not described herein.

The audio circuit 1460, a speaker 1461, and a microphone 1462 may provide an audio interface between the user and the mobile phone. The audio circuit 1460 may convert received audio data into an electrical signal, and transmit the electrical signal to the speaker 1461. The speaker 1461 converts the electrical signal into a voice signal for output. In addition, the microphone 1462 converts a collected voice signal into an electrical signal. The audio circuit 1460 receives the electrical signal, converts the electrical signal into audio data, outputs the audio data to the processor 1480 for processing, and sends the audio data to, for example, another mobile phone through the RF circuit 1410, or outputs the audio data to the memory 1420 for further processing.

Wi-Fi is a short-distance wireless transmission technology. The mobile phone may help, by using the Wi-Fi module 1470, the user to receive and send an email, browse a web page, access streaming media, and the like. The Wi-Fi module 1470 provides wireless broadband internet access for the user. Although the Wi-Fi module 1470 is shown in FIG. 14, it should be understood that the Wi-Fi module 1470 is not a mandatory part of the mobile phone, and may be omitted as required provided that the essence of the present invention is not changed.

The processor 1480 is a control center of the mobile phone, is connected to all parts of the entire mobile phone by using various interfaces and lines, and performs various functions of the mobile phone and data processing by running or executing the software program and/or the module stored in the memory 1420 and by invoking data stored in the memory 1420, to perform overall monitoring on the mobile phone. Optionally, the processor 1480 may include one or more processing units. Preferably, an application processor and a modem processor may be integrated into the processor 1480, where the application processor mainly processes an operating system, a user interface, an application, and the like; and the modem processor mainly processes wireless communication. It may be understood that the foregoing modem processor may not be integrated into the processor 1480.

The mobile phone further includes the power supply 1490 (such as a battery) that supplies power to each part. Preferably, the power supply may be logically connected to the processor 1480 by using a power management system, to implement functions such as charging management, discharging management, and power consumption management by using the power supply management system.

The mobile phone may further include a camera, although the camera is not shown. Optionally, a position of the camera on the mobile phone may be front-facing or rear-facing. This is not limited in this embodiment of this application.

Optionally, the mobile phone may include a single camera, a dual-camera, a triple-lens camera, or the like. This is not limited in this embodiment of this application.

For example, the mobile phone may include a triple-lens camera, where one is a primary camera, one is a wide-angle camera, and one is a long-focus camera.

Optionally, when the mobile phone includes a plurality of cameras, the plurality of cameras may all be front-facing cameras, or may all be rear-facing cameras, or some of the cameras may be front-facing cameras, and the other cameras may be rear-facing cameras. This is not limited in this embodiment of this application.

In addition, the mobile phone may further include a Bluetooth module and the like, although not shown in the figure. Details are not described herein.

An embodiment of this application further provides a computer-readable storage medium. The computer-readable storage medium stores a computer program. When the computer program is executed by a processor, the steps in the foregoing method embodiments can be implemented.

An embodiment of this application provides a computer program product. When the computer program product is run on a terminal device, the terminal device is enabled to implement the steps in the foregoing method embodiments.

When the integrated unit is implemented in a form of a software functional unit and is sold or used as an independent product, the integrated unit may be stored in a computer-readable storage medium. Based on such an understanding, in this application, all or some of the procedures of the method in the foregoing embodiments may be implemented by a computer program instructing related hardware. The computer program may be stored in a computer-readable storage medium. When the computer program is executed by a processor, steps in the foregoing method embodiments can be implemented. The computer program includes computer program code, and the computer program code may be in a form of source code, a form of object code, a form of an executable file, some intermediate forms, or the like. The computer-readable storage medium may include at least any entity or apparatus that can carry computer program code to an apparatus/a terminal device, a recording medium, a computer memory, a read-only memory (ROM, Read-Only Memory), a random access memory (RAM, Random Access Memory), an electrical carrier signal, a telecommunications signal, and a software distribution medium, for example, a USB flash drive, a removable hard disk, a magnetic disk, or an optical disk. In some jurisdictions, according to legislation and patent practice, a computer-readable storage medium cannot be an electrical carrier signal or a telecommunications signal.

In the foregoing embodiments, the descriptions of all embodiments have respective focuses. For a part that is not described in detail in an embodiment, refer to related descriptions in other embodiments.

A person of ordinary skill in the art may be aware that, in combination with the examples described in embodiments disclosed in this specification, units and algorithm steps may be implemented by electronic hardware or a combination of computer software and electronic hardware. Whether the functions are implemented by hardware or software depends on particular applications and design constraints of the technical solutions. A person skilled in the art may use different methods to implement the described functions for each particular application, but it should not be considered that the implementation goes beyond the scope of this application.

In embodiments provided in this application, it should be understood that the disclosed apparatus/terminal device and method may be implemented in other manners. For example, the described apparatus/terminal device embodiments are merely examples. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in embodiments.

The foregoing embodiments are merely intended to describe the technical solutions of this application, but are not to limit this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of embodiments of this application, and these modifications and replacements shall fall within the protection scope of this application.

What is claimed is:

1. A page processing method, comprising:

processing application state settings of a plurality of application state settings in an application history manager, each of the application state settings being set by way of a respective function switch, wherein the respective function switches are in a first graphical user interface, and wherein the application state settings each correspond to one application of a plurality of applications managed by the application history manager;

obtaining the application state setting corresponding to a first currently running application of the plurality of applications to determine a first current application state of the first currently running application, wherein the first application state is one of two application states;

in response to the first current application state being a first application state, obtaining first page browsing information of the first currently running application, and establishing a first historical browsing view of the first currently running application based on the first page browsing information, wherein the first page browsing information comprises one or more browsing pages browsed by a user in the first currently running application;

in response to detecting a preset trigger instruction for the first currently running application, displaying the first historical browsing view of the first currently running application; and returning, in response to a selection operation performed by the user in the first historical browsing view, to a target browsing page corresponding to the selection operation, wherein the target browsing page is any of the browsing pages browsed by the user in the first currently running application;

obtaining the application state setting corresponding to a second currently running application to determine a second current application state of the second currently running application; and in response to the second current application state of the second currently running application being a second application state, prohibiting establishing a second historical browsing view of one or more browsing pages browsed by the user in the second currently running application.

2. The page processing method according to claim 1, further comprising:
obtaining page thumbnails corresponding to the one or more browsing pages and browsing times corresponding to the one or more browsing pages in the first page browsing information, wherein the page thumbnails are included in the first historical browsing view of the first currently running application and arranged based on the browsing times.

3. The page processing method according to claim 2, further comprising:
obtaining a respective page identifier corresponding to each browsing page in the first page browsing information; and
determining a first target browsing page based on the respective page identifier and a preset page identifier in the first currently running application, and obtaining a first page thumbnail corresponding to the first target browsing page and a first browsing time corresponding to the first target browsing page,
wherein the first page thumbnail is arranged in the first historical browsing view based on the first browsing time.

4. The page processing method according to claim 2, further comprising:
obtaining page content corresponding to each browsing page in the first page browsing information; and
determining a second target browsing page based on the page content, and obtaining a second page thumbnail corresponding to the second target browsing page and a second browsing time corresponding to the second target browsing page,
wherein the second page thumbnail is arranged in the first historical browsing view based on the second browsing time.

5. The page processing method according to claim 2, wherein after establishing the first historical browsing view of the first currently running application based on the first page browsing information, the method further comprises:
obtaining page content corresponding to each browsing page in the first page browsing information;
determining a page keyword corresponding to each page thumbnail based on each piece of page content; and
in response to a search keyword entered by the user being received, obtaining and displaying a third page thumbnail based on the search keyword and the page keyword, wherein the third page thumbnail is any of the page thumbnails.

6. The page processing method according to claim 1, further comprising:
obtaining third page browsing information of a third application;
establishing a third historical browsing view of the third application based on the third page browsing information; and
displaying the third historical browsing view of the third application,
wherein the first historical browsing view of the first currently running application and the third historical browsing view of the third application are concurrently displayed.

7. The page processing method according to claim 6, wherein the target browsing page is a first target browsing page, and after the displaying the first historical browsing view of the first application and the third historical browsing view of the third application, the method further comprises:
dragging a first page thumbnail to a second page thumbnail based on a dragging operation performed by the user between the first historical browsing view and the third historical browsing view, wherein the first page thumbnail is any page thumbnail in the first historical browsing view, and the second page thumbnail is any page thumbnail in the third historical browsing view; and
the returning, in response to the selection operation performed by the user in the first historical browsing view, to the first target browsing page corresponding to the selection operation comprises:
returning, in response to a selection operation performed by the user on the second page thumbnail, to a second target browsing page that comprises the first page thumbnail, wherein the second target browsing page is a browsing page corresponding to the second page thumbnail.

8. A terminal device, comprising:
a processor; and
a non-transitory computer readable medium which contains computer-executable instructions;
the processor is configured to execute the computer-executable instructions to enable the terminal device to perform operations comprising:
processing application state settings of a plurality of application state settings in an application history manager, each of the application state settings being set by way of a respective function switch, wherein the respective function switches are in a first graphical user interface, and wherein the application state settings each correspond to one application of a plurality of applications managed by the application history manager;
obtaining the application state setting corresponding to a first currently running application of the plurality of applications to determine a first current application state of the first currently running application, wherein the first application state is one of two application states;
in response to the first current application state being a first application state, obtaining first page browsing information of the first currently running application, and establishing a first historical browsing view of the first currently running application based on the first page browsing information, wherein the first page browsing information comprises one or more browsing pages browsed by a user in the first currently running application;
in response to detecting a preset trigger instruction for the first currently running application, displaying the first historical browsing view of the first currently running application; and
returning, in response to a selection operation performed by the user in the first historical browsing view, to a target browsing page corresponding to the selection operation, wherein the target browsing page is any of the browsing pages browsed by the user in the first currently running application;
obtaining the application state setting corresponding to a second currently running application to determine a second current application state of the second currently running application; and
in response to the second current application state of the second currently running application being a second application state, prohibiting establishing a second historical browsing view of one or more browsing pages browsed by the user in the second currently running application.

9. The terminal device according to claim 8, wherein the operations further comprise:
obtaining page thumbnails corresponding to the one or more browsing pages and browsing times corresponding to the one or more browsing pages in the first page browsing information, wherein the page thumbnails are included in the first historical browsing view of the first currently running application and arranged based on the browsing times.

10. The terminal device according to claim 9, wherein wherein the operations further comprise:
obtaining a respective page identifier corresponding to each browsing page in the first page browsing information; and
determining a first target browsing page based on the respective page identifier and a preset page identifier in the first currently running application, and obtaining a first page thumbnail corresponding to the first target browsing page and a first browsing time corresponding to the first target browsing page,
wherein the first page thumbnail is arranged in the first historical browsing view based on the first browsing time.

11. The terminal device according to claim 9, wherein the operations further comprise:
obtaining page content corresponding to each browsing page in the first page browsing information; and
determining a second target browsing page based on the page content, and obtaining a second page thumbnail corresponding to the second target browsing page and a second browsing time corresponding to the second target browsing page,
wherein the second page thumbnail is arranged in the first historical browsing view based on the second browsing time.

12. The terminal device according to claim 9, wherein after establishing the first historical browsing view of the first currently running application based on the first page browsing information, and the operations further comprise:
obtaining page content corresponding to each browsing page in the first page browsing information;
determining a page keyword corresponding to each page thumbnail based on each piece of page content; and
in response to a search keyword entered by the user being received, obtaining and displaying a third page thumbnail based on the search keyword and the page keyword, wherein the third page thumbnail is any of the page thumbnails.

13. The terminal device according to claim 8, wherein the operations further comprise:
obtaining third page browsing information of a third application;
establishing a third historical browsing view of the third application based on the third page browsing information; and
displaying the third historical browsing view of the third application,
wherein the first historical browsing view of the first currently running application and the third historical browsing view of the third application are concurrently displayed.

14. The terminal device according to claim 13, wherein the target browsing page is a first target browsing page, and after the displaying the first historical browsing view of the first application and the third historical browsing view of the third application, and the operations further comprise:
dragging a first page thumbnail to a second page thumbnail based on a dragging operation performed by the user between the first historical browsing view and the third historical browsing view, wherein the first page thumbnail is any page thumbnail in the first historical browsing view, and the second page thumbnail is any page thumbnail in the third historical browsing view; and
the returning, in response to the selection operation performed by the user in the first historical browsing view, to the first target browsing page corresponding to the selection operation comprises:
returning, in response to a selection operation performed by the user on the second page thumbnail, to a second target browsing page that comprises the first page thumbnail, wherein the second target browsing page is a browsing page corresponding to the second page thumbnail.

15. A non-transitory computer readable medium which contains computer-executable instructions, wherein the computer-executable instructions, when executed by a processor, enables a terminal device to perform operations comprising:
processing application state settings of a plurality of application state settings in an application history manager, each of the application state settings being set by way of a respective function switch, wherein the respective function switches are in a first graphical user interface, and wherein the application state settings each correspond to one application of a plurality of applications managed by the application history manager;
obtaining the application state setting corresponding to a first currently running application of the plurality of applications to determine a first current application state of the first currently running application, wherein the first application state is one of two application states;
in response to the first current application state being a first application state, obtaining first page browsing information of the first currently running application, and establishing a first historical browsing view of the first currently running application based on the first page browsing information, wherein the first page browsing information comprises one or more browsing pages browsed by a user in the first currently running application;
in response to detecting a preset trigger instruction for the first currently running application, displaying the first historical browsing view of the first currently running application; and
returning, in response to a selection operation performed by the user in the first historical browsing view, to a target browsing page corresponding to the selection operation, wherein the target browsing page is any of the browsing pages browsed by the user in the first currently running application;
obtaining the application state setting corresponding to a second currently running application to determine a second current application state of the second currently running application; and
in response to the second current application state of the second currently running application being a second application state, prohibiting establishing a second historical browsing view of one or more browsing pages browsed by the user in the second currently running application.

16. The page processing method according to claim 1, further comprising:

detecting actuation of a third application;

in response to detecting the actuation of the third application, causing the third application to be displayed as a third currently running application, wherein the first currently running application is displayed in a first portion of a second graphical user interface, and the third currently running application is displayed in a second portion of the second graphical user interface;

obtaining the application state setting corresponding to the third currently running application to determine a third current application state of the third currently running application;

in response to determining the third current application state of the third currently running application is the first application state, obtaining third page browsing information of the third currently running application, and establishing a third historical browsing view of the third currently running application based on the third page browsing information, wherein the third page browsing information comprises one or more browsing pages browsed by the user in the third currently running application; and in response to detecting a preset trigger instruction for the third currently running application, displaying the third historical browsing view of the third currently running application.

17. The page processing method according to claim 16, further comprising:

in response to an instruction to concurrently display the first historical browsing view and the third historical browsing view, displaying (1) the first historical browsing view in the first portion of the second graphical user interface, and (2) the third historical browsing view in the second portion of the second graphical user interface.

18. The page processing method according to claim 17, wherein the first historical browsing view comprises one or more thumbnails corresponding to one or more of the one or more browsing pages included in the first page browsing information, the third historical browsing view comprises one or more thumbnails corresponding to one or more of the one or more browsing pages included in the third page browsing information, and the method further comprises:

dragging a first thumbnail of the thumbnails included in the first historical browsing view to the third historical browsing view based on a dragging operation performed by the user between the first historical browsing view and the third historical browsing view; and adding the first thumbnail and information associated with the browsing page corresponding to the first thumbnail to the third historical browsing view.

19. The page processing method according to claim 1, wherein the first historical browsing view comprises one or more thumbnails corresponding to one or more of the one or more browsing pages included in the first page browsing information, the first historical browsing view is displayed in a first portion of a second graphical user interface, a third application is displayed in a second portion of the second graphical user interface, and the method further comprises:

sharing information associated with the browsing page corresponding to a first thumbnail of the thumbnails included in the first historical browsing view with the third application based on a dragging operation performed by the user from the first thumbnail to the second portion of the second graphical user interface.

* * * * *